(12) United States Patent
Kwok et al.

(10) Patent No.: US 10,607,556 B2
(45) Date of Patent: Mar. 31, 2020

(54) DRIVING SCHEME FOR FERROELECTRIC LIQUID CRYSTAL DISPLAYS

(71) Applicant: The Hong Kong University of Science and Technology, Hong Kong (CN)

(72) Inventors: Hoi Sing Kwok, Hong Kong (CN); Tsz Kin Ho, Hong Kong (CN); Vladimir G. Chigrinov, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 15/524,524

(22) PCT Filed: Nov. 6, 2015

(86) PCT No.: PCT/CN2015/093988
§ 371 (c)(1),
(2) Date: May 4, 2017

(87) PCT Pub. No.: WO2016/070843
PCT Pub. Date: May 12, 2016

(65) Prior Publication Data
US 2017/0365228 A1    Dec. 21, 2017

Related U.S. Application Data

(60) Provisional application No. 62/123,107, filed on Nov. 7, 2014.

(51) Int. Cl.
*G09G 3/36* (2006.01)
*G09G 3/20* (2006.01)
*G02F 1/1362* (2006.01)

(52) U.S. Cl.
CPC ....... *G09G 3/3651* (2013.01); *G02F 1/13624* (2013.01); *G09G 3/2014* (2013.01);
(Continued)

(58) Field of Classification Search
CPC .................................................. G09G 3/3631
See application file for complete search history.

(56) References Cited

U.S. PATENT DOCUMENTS 4,090,219 A   5/1978   Ernstoff et al.
4,582,396 A   4/1986   Bos et al.
(Continued)

FOREIGN PATENT DOCUMENTS

CN   102890910 A   1/2013
EP   0525675 A2    2/1993
(Continued)

OTHER PUBLICATIONS

Blalock, Travis N., et al., "8-Bit/Color 1024×768 Microdisplay with Analog In-Pixel Pulse Width Modulation and Retinal Averaging Offset Correction", *2000 Symposium on VLSI Circuits Digest of Technical Papers*, pp. 20-23.
(Continued)

*Primary Examiner* — Chad M Dicke
(74) *Attorney, Agent, or Firm* — Leydig, Voit & Mayer, Ltd.

(57) ABSTRACT

Systems and methods for driving a pixel of a liquid crystal pixel array with a driving circuit are provided. An exemplary method includes: providing a data signal (Dm) to a storage element via the first transistor (T1); and providing a ramping voltage signal ($V_{RAMP}$) to a gate of a second transistor (T2) of the driving circuit to control the on-off status of the second transistor (T2); wherein the ramping voltage signal ($V_{RAMP}$) is based on data stored at the storage element; and wherein a duration of an on-state of the second transistor (T2) corresponds to a transmitting state for the pixel.

18 Claims, 28 Drawing Sheets

(52) U.S. Cl.
CPC ......... *G09G 3/2092* (2013.01); *G09G 3/3648* (2013.01); *G09G 3/3685* (2013.01); G09G 2300/0842 (2013.01); G09G 2300/0861 (2013.01); G09G 2300/0866 (2013.01); G09G 2310/0235 (2013.01); G09G 2310/0251 (2013.01); G09G 2310/0259 (2013.01); G09G 2320/0223 (2013.01)

(56) References Cited

U.S. PATENT DOCUMENTS

| | | | |
|---|---|---|---|
| 4,709,995 | A | 12/1987 | Kuribayashi et al. |
| 4,776,676 | A | 10/1988 | Inoue et al. |
| 4,843,381 | A | 6/1989 | Baron |
| 5,010,327 | A | 4/1991 | Wakita et al. |
| 5,151,803 | A | 9/1992 | Wakita et al. |
| 5,227,900 | A | 7/1993 | Inaba et al. |
| 5,233,338 | A | 8/1993 | Surguy |
| 5,260,625 | A | 11/1993 | Holden et al. |
| 5,534,884 | A | 7/1996 | Mase et al. |
| 5,617,229 | A * | 4/1997 | Yamamoto ........ G02F 1/133621 349/106 |
| 6,278,426 | B1 * | 8/2001 | Akiyama ............ G02F 1/13624 345/205 |
| 6,351,301 | B1 * | 2/2002 | Takatori ............. C09K 19/0225 349/172 |
| 6,542,142 | B2 * | 4/2003 | Yumoto ............... G09G 3/3629 345/90 |
| 6,590,557 | B1 * | 7/2003 | Seike .................... G09G 3/367 345/204 |
| 6,987,501 | B2 * | 1/2006 | Takahashi ........... G09G 3/3629 345/211 |
| 7,196,683 | B2 | 3/2007 | Yamamoto et al. |
| 7,379,058 | B2 * | 5/2008 | Toyozawa ............ G09G 3/3648 345/204 |
| 8,305,313 | B2 * | 11/2012 | Furuya ................. G09G 3/006 345/204 |
| 9,054,698 | B2 * | 6/2015 | Takatori ............... G09G 3/3648 |
| 9,366,934 | B2 | 6/2016 | Kumar et al. |
| 9,368,053 | B2 * | 6/2016 | Koyama .................. G09G 3/20 |
| 9,709,877 | B2 * | 7/2017 | Kompanets ............. G02F 1/141 |
| 2001/0050664 | A1 * | 12/2001 | Yamazaki ........... G02F 1/13624 345/76 |
| 2002/0070913 | A1 * | 6/2002 | Kimura ............. H01L 21/76895 345/92 |
| 2004/0119932 | A1 | 6/2004 | Kim |
| 2004/0222953 | A1 * | 11/2004 | Smith ................... G09G 3/3688 345/87 |
| 2006/0001634 | A1 * | 1/2006 | Lee ...................... G09G 3/3648 345/98 |
| 2006/0232503 | A1 * | 10/2006 | Asada .................. G09G 3/3648 345/55 |
| 2006/0279561 | A1 | 12/2006 | Ozaki et al. |
| 2007/0057890 | A1 * | 3/2007 | Ayel ..................... G09G 3/3648 345/94 |
| 2008/0018630 | A1 * | 1/2008 | Fujino .................. G09G 3/3648 345/205 |
| 2008/0309840 | A1 | 12/2008 | Yen et al. |
| 2009/0141013 | A1 * | 6/2009 | Nagai ................... G09G 3/3659 345/211 |
| 2009/0146913 | A1 * | 6/2009 | Tanabe ................ G02F 1/13624 345/3.1 |
| 2011/0234563 | A1 * | 9/2011 | Kim ..................... G09G 3/3433 345/211 |
| 2012/0013394 | A1 * | 1/2012 | Koyama .............. G09G 3/3688 327/537 |
| 2013/0169909 | A1 * | 7/2013 | Srivastava ........ G02F 1/133753 349/96 |
| 2014/0085561 | A1 * | 3/2014 | Takatori ............... H03K 17/102 349/46 |
| 2014/0118650 | A1 | 5/2014 | Srivastava et al. |
| 2016/0202583 | A1 * | 7/2016 | Jung ................. G02F 1/134336 257/72 |

FOREIGN PATENT DOCUMENTS

| | | |
|---|---|---|
| JP | H063494 A | 2/1994 |
| KR | 2002-0027786 A | 4/2002 |

OTHER PUBLICATIONS

Koma, N., et al., "P-28: Color Field Sequential LCD Using an OCB-TFT-LCD", *SID 00 Symposium Digest of Technical Papers*, 2000, pp. 632-635.

Ishinabe, T., et al., "High-performance OCB-mode Field-Sequential-Color LCD," *Journal of the Society for Information Display*, vol. 16/2, pp. 251-256, 2008.

Yeung, F.S., et al., "Fast-Response No-Bias-Bend Liquid Crystal Displays Using Nanostructured Surfaces", *Appl. Phys. Lett.*, vol. 88, 063505, (4 pages) 2006.

Yeung, F.S., et al., "Pi-Cell Liquid Crystal Displays at Arbitrary Pretilt Angles", *Appl. Phys. Lett.*, vol. 88, 041108, pp. 041108, (4 pages total) 2006.

Kikuchi, H., et al., "Polymer-Stablized Liquid Crystal Blue Phases", *Nature Materials*, vol. 1, pp. 64-68, 2002.

Hisakado, Y., et al., "Large Electro-Optic Kerr Effect in Polymer-Stabilized Liquid-Crystalline Blue Phases", *Adv. Mater*, vol. 17, No. 1, pp. 96-98, Jan. 6, 2005.

Kikuchi, H., et al., "62.2: Invited Paper: Fast Electro-Optical Switching in Polymer-Stabilized Liquid Crystalline Blue Phases for Display Application", in *SID Symposium Digest of Technical Papers*, 2007, pp. 1737-1740.

Hartmann, W. J., "Ferroelectric Liquid Crystal Displays for Television Application", *Ferroelectrics*, vol. 122, pp. 1-26, 1991.

L. Cotter, L.K., et al., "Ferroelectric-Liquid-Crystal/Silicon-Integrated-Circuit Spatial Light Modulato", *Optical Letters*, vol. 15, No. 5, pp. 291-293, 1990.

Yabe, Y., et al., "A 1M-Pixel Full-Color Projection Display using Nematic-Cholesteric Phase-Transition Liquid Crystals", *Journal of the Society for Information Display*, vol. 1/4, pp. 411-416, 1993.

Fujikake, H., et al., "Curved Ferroelectric Liquid Crystal Matrix Displays Driven by Field-Sequential-Color and Active-Matrix Techniques", *Optical Review*, vol. 13, No. 1, pp. 14-19, 2006.

Hartmann, W. J. A. M., et al., "A Passive-Matrix-Adressed Ferroelectric Liquid-Crystal Video Display", *Proceedings of the Society for Information Display, SID*, vol. 32, No. 2, pp. 115-120, 1991.

Akimoto, O., et al., "High-Resolution FLC Microdisplay", in *Projection Displays 2000. Sixth in a Series, Proceedings of SPIE—The International Society for Optical Engineering*, vol. 3954, pp. 104-110.

State Intellectual Property Office of the P.R. China, International Search Report in International Application No. PCT/CN2015/093988 (dated Jan. 20, 2016).

* cited by examiner

100% ON ( FIG. 8 Continued )
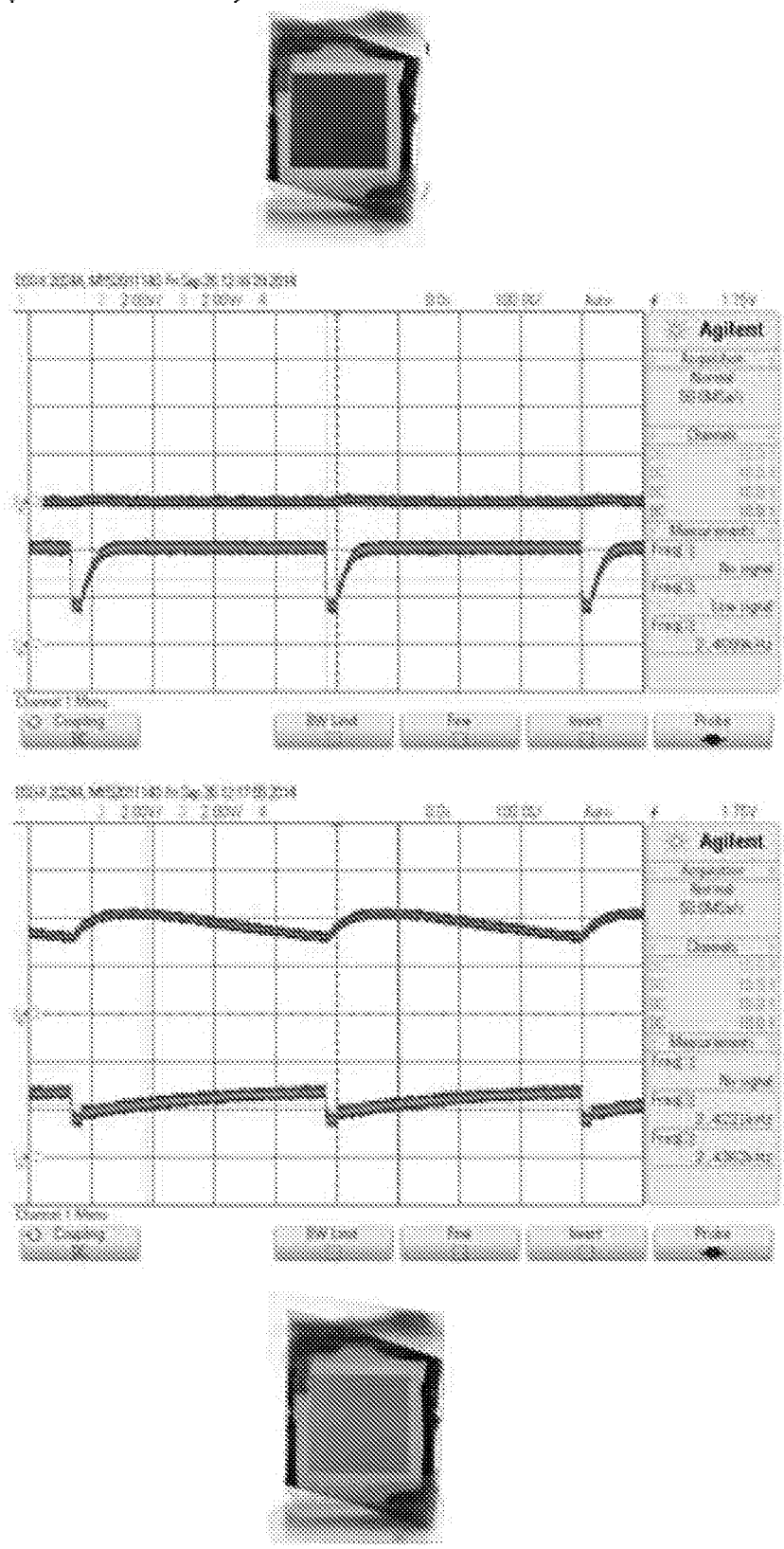

( FIG. 8 Continued )
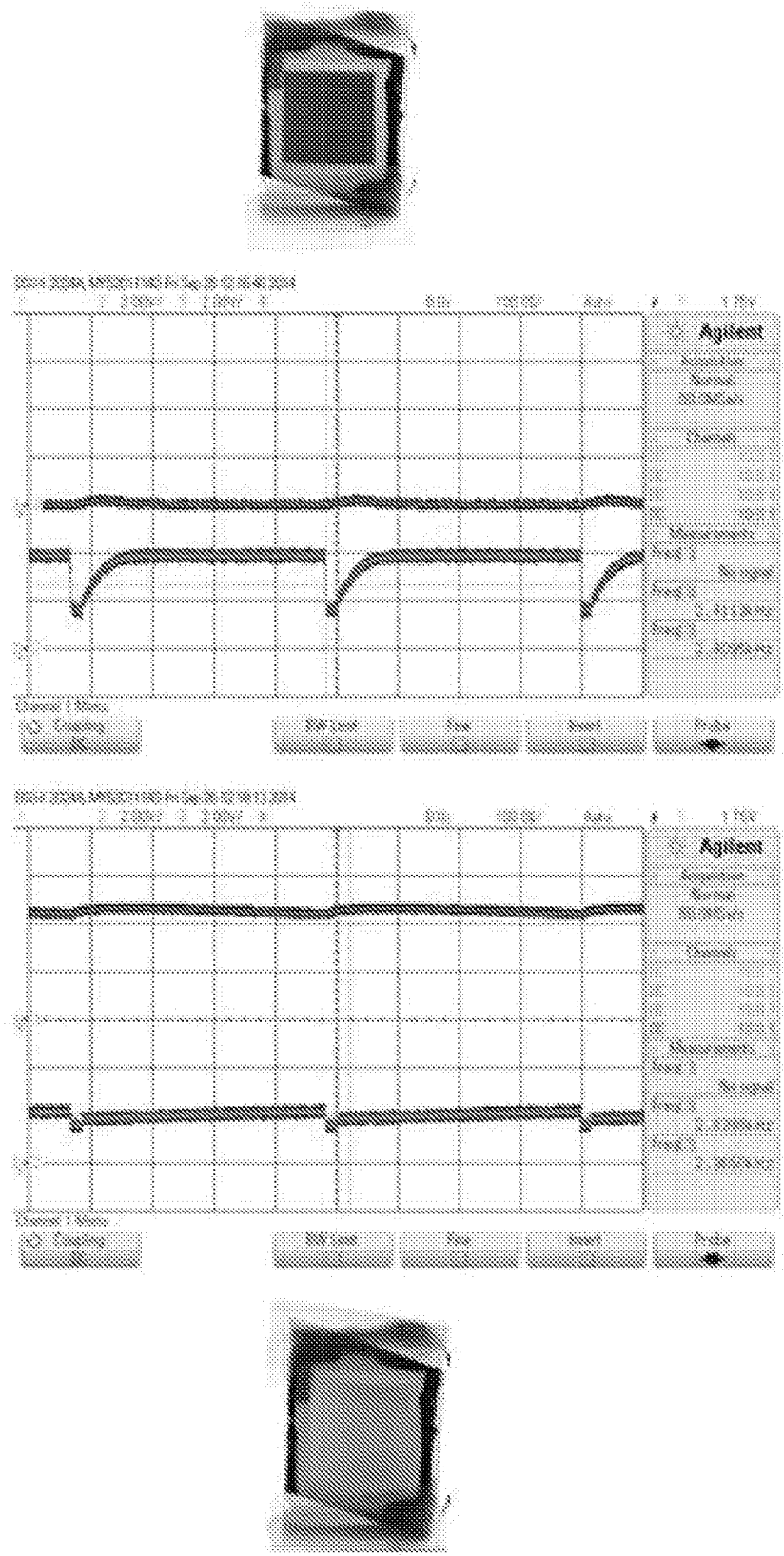

(FIG. 8 Continued)
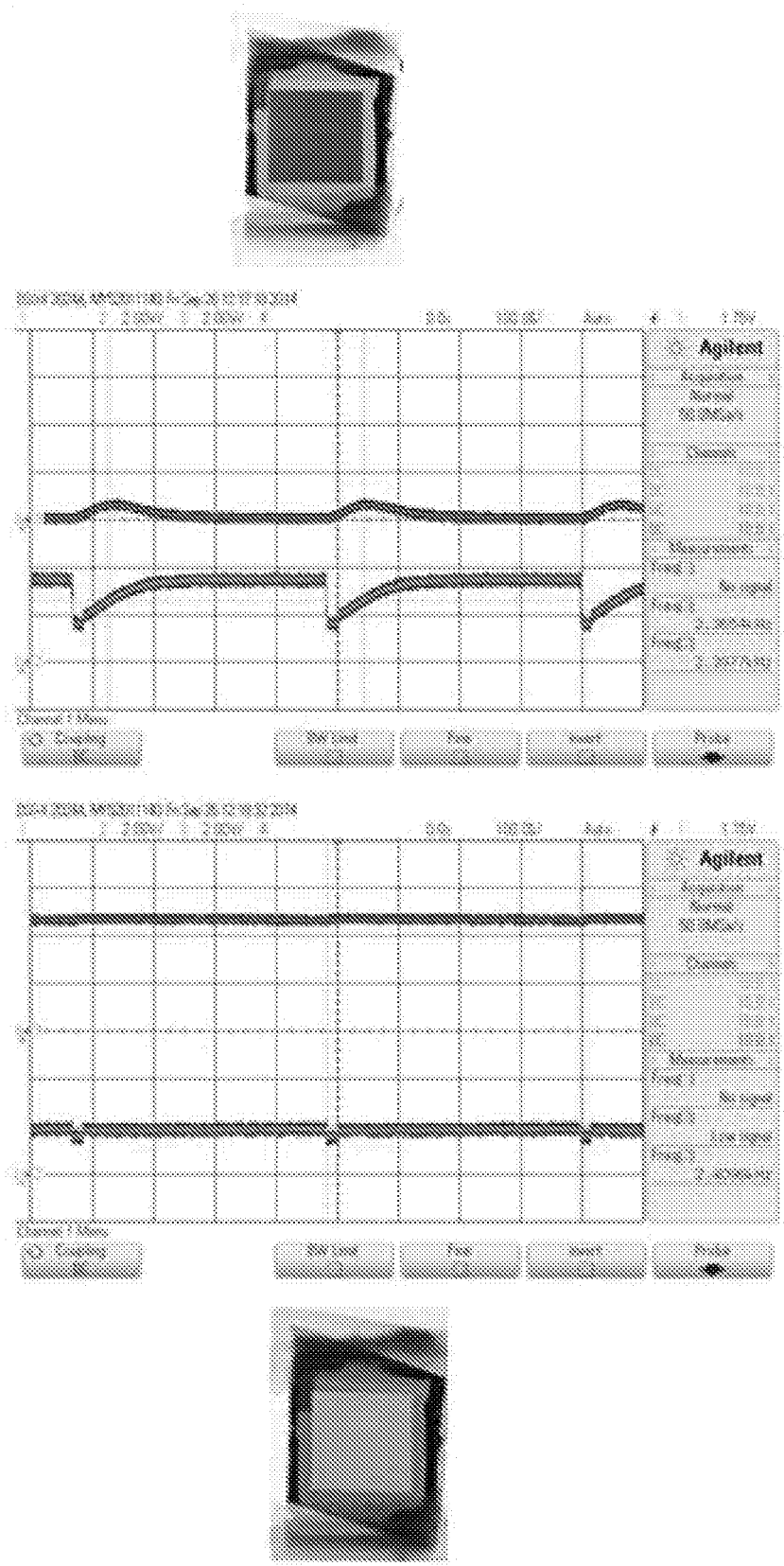

50% ON, 50% OFF ( FIG. 14 Continued )
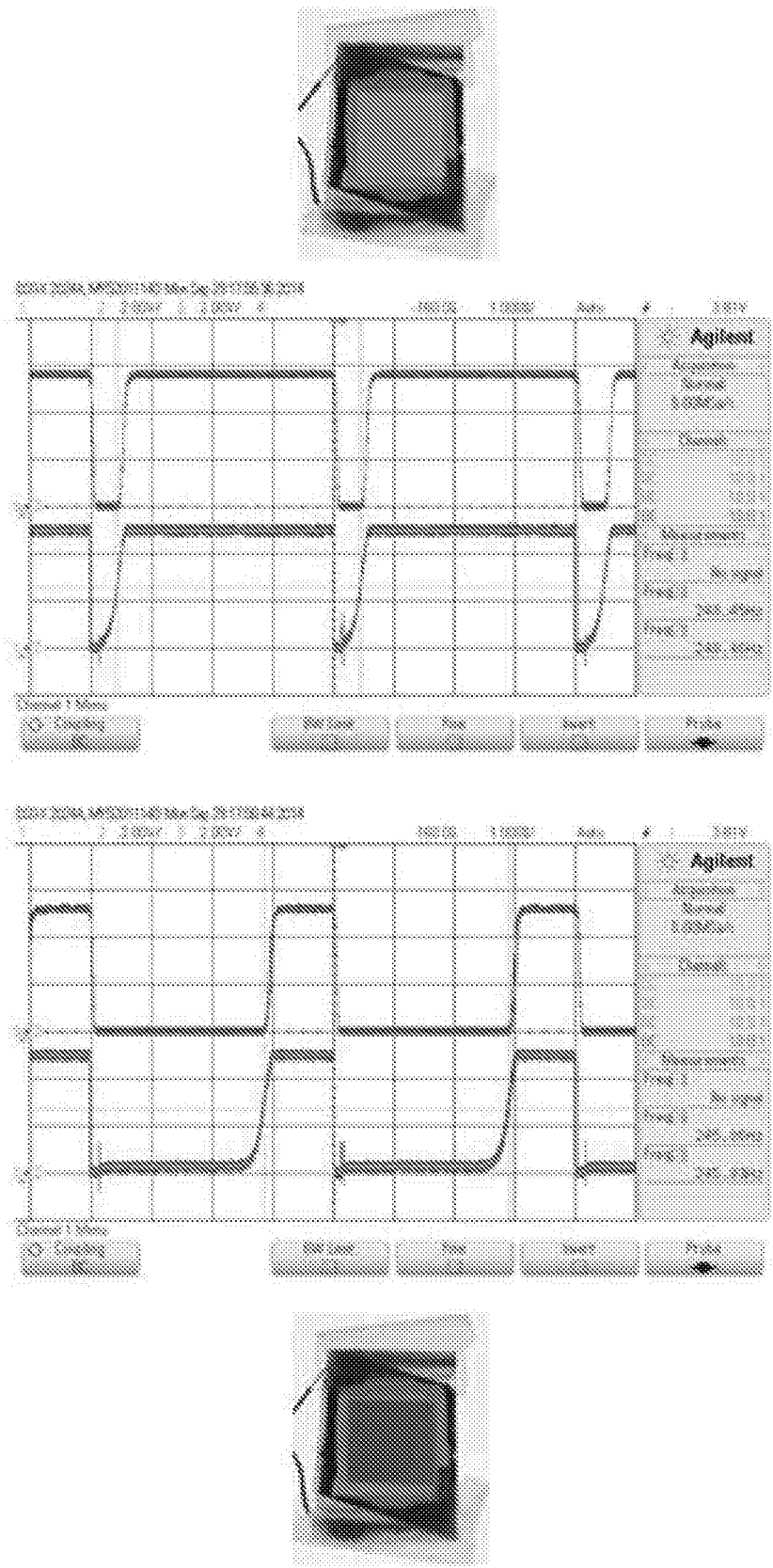

( FIG. 14 Continued )
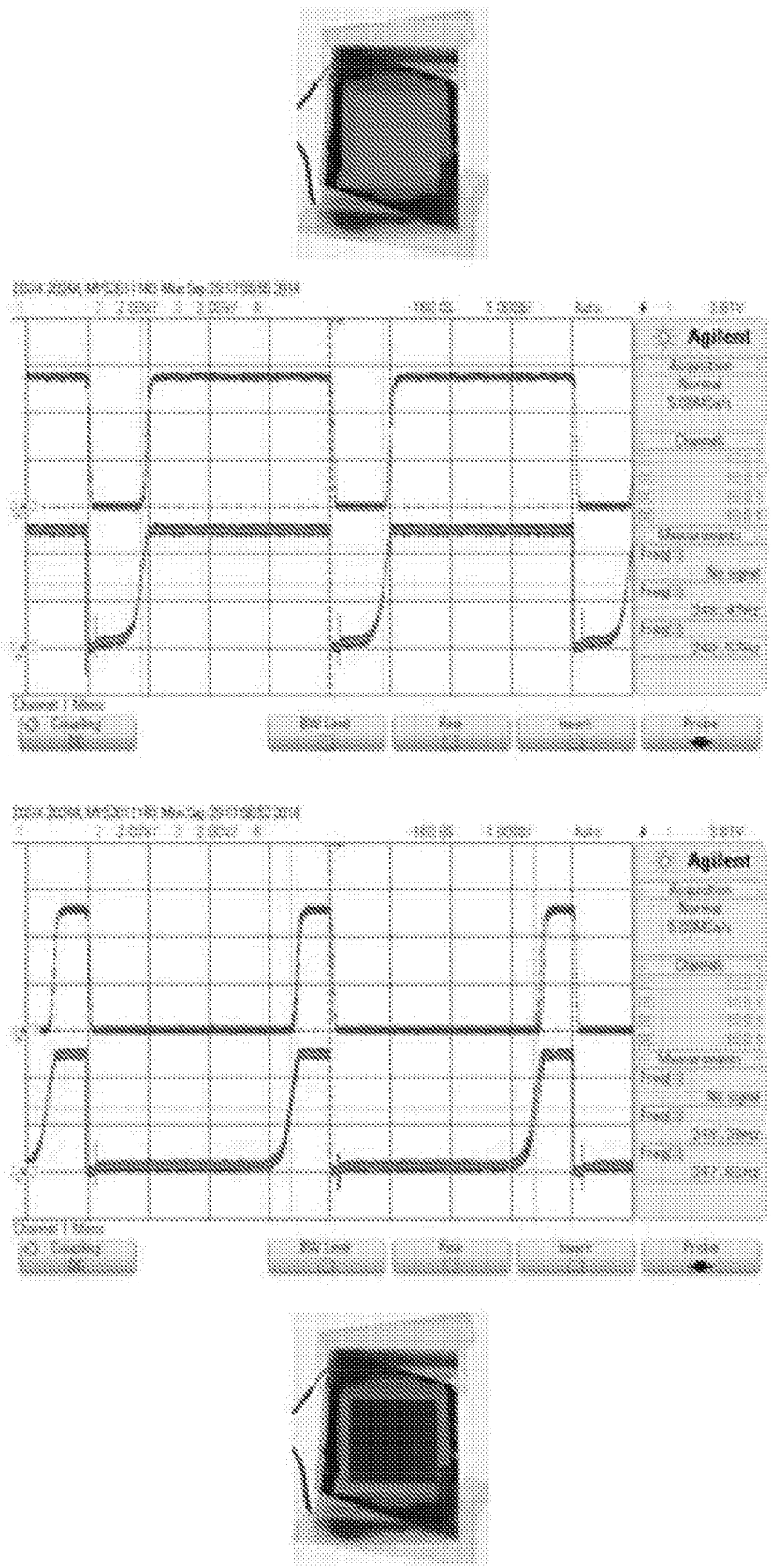

( FIG. 14 Continued )
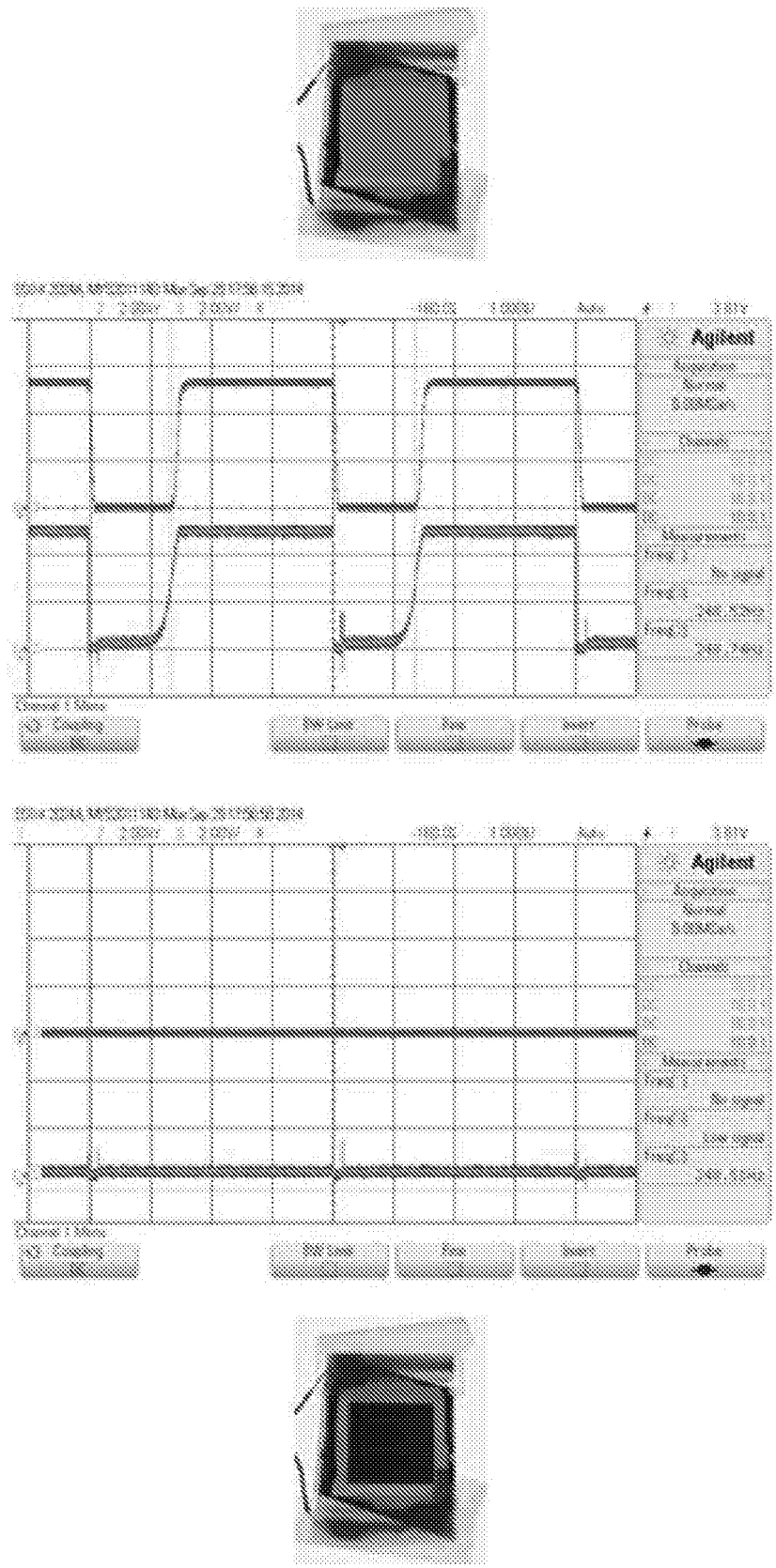

DRIVING SCHEME FOR FERROELECTRIC LIQUID CRYSTAL DISPLAYS

CROSS-REFERENCE TO RELATED APPLICATIONS

This application is a U.S. National Phase application under 35 U.S.C. § 371 of International Patent Application No. PCT/CN2015/093988, filed Nov. 6, 2015, which is a PCT application claiming the benefit of U.S. Provisional Patent Application No. 62/123,107, filed Nov. 7, 2014, both of which are incorporated by reference in their entireties.

BACKGROUND

The demands of the modern display market have changed dramatically in recent years. Displays are expected to have high resolution, low power consumption and fast response time. However, these factors are fundamentally limited in conventional liquid crystal displays (LCD). In particular, the response time is limited to a few milliseconds in nematic LCDs.

Fast response times are needed in LCDs in order to reduce image blurring for fast moving displays such as in sport broadcasting. Fast response times are also needed in field sequential color (FSC) displays which operate on a principle that can improve the optical efficiency of LCDs by several magnitudes. This quality is important for building displays with low power consumption.

There are several approaches to fast LCDs. With very thin cell gaps, the response time of an LCD can be reduced to fractions of a millisecond. Likewise, fast response modes such as the optically-compensated bend (OCB) mode can have a response time of 0.5 ms. Also a No-Bias-Bend (NBB) mode has the same response time as the OCB mode without the complication of a bias voltage. The operating voltages for both the OCB and NBB modes are rather high as the dark state relies on a homeotropic alignment. When flexoelectric effect is explored, response times can be reduced to 0.3 ms, but the operating voltage remains high. Even the "Blue Phase" LCD where the response times may be 0.5 ms have the disadvantage of high operating temperature and large driving voltage. Thus, none of the approaches is satisfactory in realizing displays having high resolution, low power consumption, and fast response time.

SUMMARY

In an exemplary embodiment, the invention provides a driving circuit for a pixel of a liquid crystal pixel array, comprising: a first thin film transistor; a second thin film transistor; an internal capacitor; and a voltage source; wherein the first thin film transistor is connected to a data signal, a scanning signal, and the second thin film transistor; wherein the second thin film transistor is further connected to the internal capacitor, the voltage source, and a first electrode of the liquid crystal cell; wherein the data signal is configured to control the duration of the voltage applied to the first electrode within a frame.

In another exemplary embodiment, the invention provides a driving circuit for a pixel of a liquid crystal pixel array, comprising: a first thin film transistor; a second thin film transistor; a third thin film transistor; an internal capacitor; and a voltage source; wherein the first thin film transistor is connected to a data signal, a scanning signal, and the second thin film transistor; wherein the second thin film transistor is further connected to the internal capacitor, the voltage source, and the third thin film transistor; and wherein both the second thin film transistor and the third thin film transistor are further connected to a first electrode of the liquid crystal cell; wherein the data signal is configured to control the duration of the voltage applied to the first electrode within a frame.

In another exemplary embodiment, the invention provides a method for driving a pixel of a liquid crystal pixel array with a driving circuit, wherein a data signal for the pixel is connected to a first transistor of the driving circuit and an electrode of the pixel is connected to a second transistor of the driving circuit, the method comprising: providing the data signal to a storage element via the first transistor; and providing a ramping voltage signal to a gate of the second transistor of the driving circuit to control the on-off status of the second transistor; wherein the ramping voltage signal is based on data stored at the storage element; and wherein a duration of an on-state of the second transistor corresponds to a transmitting state for the pixel.

Further exemplary embodiments are discussed in additional detail below.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
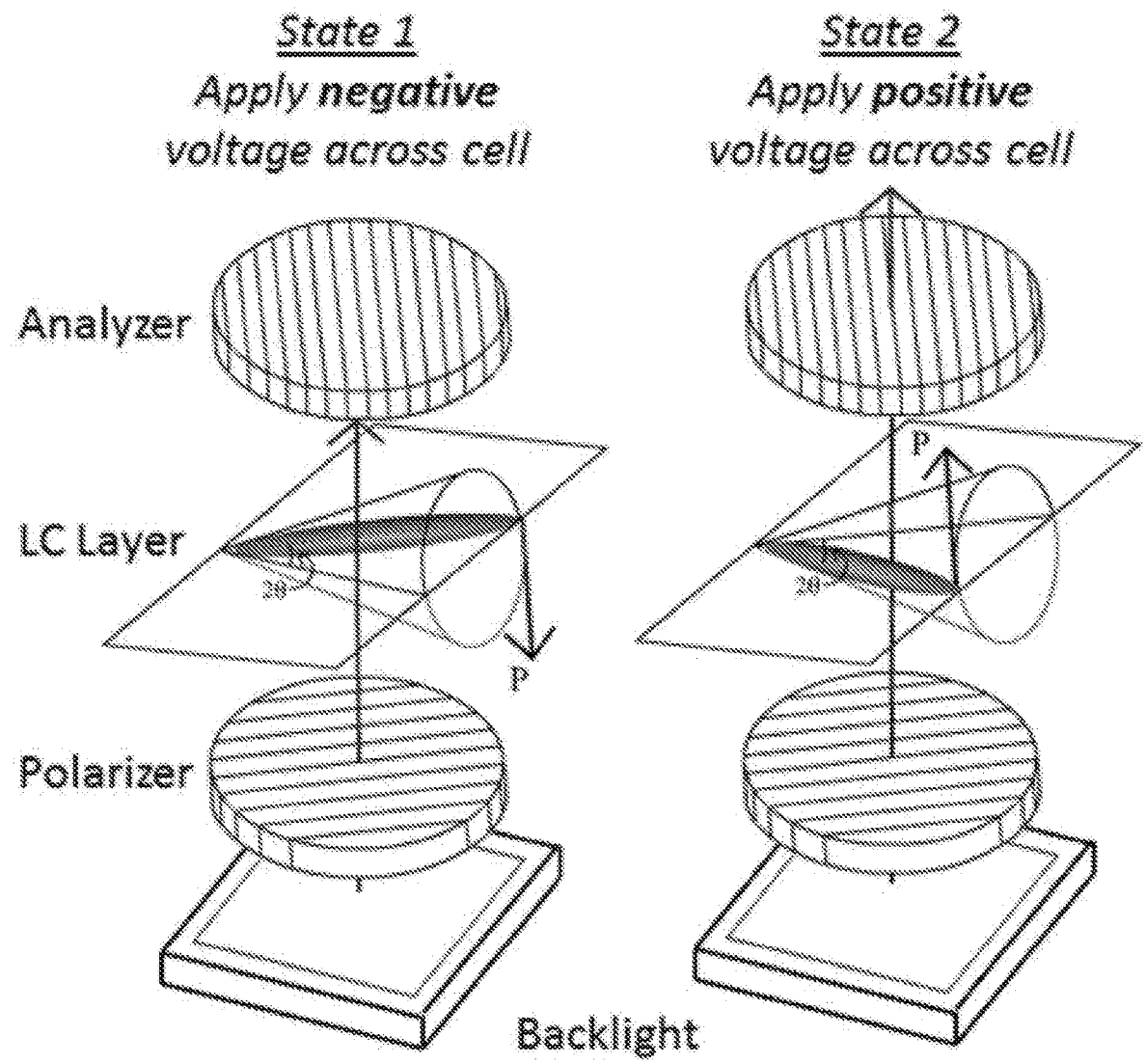
FIG. 1 is an exemplary illustration of the basic optics mechanism of switching electrically suppressed helix (ESH) ferroelectric liquid crystal (FLC) cell into bright and dark states.

Embodiments of this disclosure describe driving scheme for a pixel in active-matrix liquid crystal shutter arrays which respond to electric signal polarity, for example, ferroelectric liquid crystal (FLC) displays. The driving scheme is capable of producing continuous grayscales. Some embodiments of the disclosure provide for realization of very uniform time-controlled grayscales using compact thin film transistor (TFT) pixel designs. Embodiments described herein are instrumental in obtaining high quality liquid crystal displays, and are applicable, for example, to field sequential color (FSC) and high-resolution direct-view flat-panel display.

Although FLCs are capable of responding in the 10's of microseconds range, conventional FLCs are difficult to manufacture and difficult to drive. Another drawback to FLCs are that they are easily damaged by mechanical force. Even the slightest shock can irreversibly damage the FLC cell. To combat this susceptibility to mechanical force, electrically suppressed helix (ESH) FLC is explored for fast response times, stability against mechanical shock, and ease of fabrication. There are many possible applications of such fast display modes including liquid crystal displays for fast moving images, as well as FSC displays that do not require the use of color filters to produce full color images. The elimination of color filters and sub-pixels in FSC driving also helps to improve pixel density.

Exemplary embodiments of the disclosure provide electronic driving methods for such fast ESH LCD. In some embodiments, since ferroelectric displays may have a large dipole moment, a large instantaneous current is provided to switch the pixel capacitor in the display. In some embodiments, a continuous grayscale may be desirable, and the pixel circuit design with large instantaneous current is not straight-forward.

In general, there are two ways to produce color images in a pixelated electronic display. The most popular conventional displays are designed on basis of spatially "simultaneous additive color mixing process," in which color displaying is carried out with three separated sub-pixels of primary colors of red (R) green (G) and blue (B). Absorptive RGB color filters are used to produce the primary colors. If the subpixels are small enough, the human eye integrates the RGB colors to produce the desired color. This spatial color mixing or spatial multiplex method has the advantage of easy fabrication, but also has two main disadvantages: (1) the color filters are costly and (2) more than two-thirds of the light from the backlight unit (BLU) is absorbed. These disadvantages are highly undesirable and are the main reasons why conventional LCDs have low power efficiency of merely 5-8% depending on the resolution and pixel design.

The other method to produce color in a display is to use the FSC scheme. This scheme is essentially a time multiplex color scheme. In FSC, the backlight unit sequentially changes color in the RGB sequence. Each frame of a display is separated in RGB subframes, in synchrony with the RGB backlight. If the frame rate is fast enough, the eye will integrate the primary colors and produce the desired color for the pixels. FSC displays offer several fundamental advantages over conventional spatial color displays. The absence of sub-pixels and color filters give high transmission, larger aperture ratio, and the possibility of at least three times higher pixel density as well as three times less power consumption. However, the operation frequency of FSC display is fundamentally three times higher than normal display. It is estimated that a subframe rate of around 360-480 Hz is required to eliminate the color separation rainbow effect for FSC displays.

ESH FLC is capable of such fast operation and can be used to implement such FSC displays. ESH is not only limited to FSC displays but can also be used in the conventional spatial color scheme for fast LCD operation to eliminate image blurring effect.

Ferroelectric liquid crystals have large dipole moment and are difficult to drive to achieve high resolution and high speed displays. Generally, there are three approaches to achieve grayscales for ferroelectric liquid crystal displays. The first approach is amplitude-controlled gray levels method, the second is the time-controlled gray levels method, and the third is the area-controlled gray levels method.

In the amplitude-controlled method, also known as domain size controlled method, the ratio of switched to un-switched domains in a single pixel is controlled. Since the distribution of threshold for the small domains somewhat smear out, the gradation of grays is achieved by varying the amplitude of the switching pulse across the liquid crystal layer. This method can be implemented with single transistor (1T1C) pixel structure in active matrix display and is commonly used for conventional antiferroelectric liquid crystal (AFLC). However, the presence of hysteresis prohibits the adoption of amplitude-control grayscale scheme in active matrix FLC display, because the result of an applied pulse would depend on the previous state due to the asymmetric hysteresis behavior of FLC.

In time-controlled gray levels method, also referred to as pulse width modulation (PWM) or pulse duration modulation (PDM) method, a plurality of gradations can be obtained by controlling the number of inversions of a drive voltage in a constant period by changing the pulse number. Gray level is defined for every pixel by rapidly repeating the scanning of the FLC matrix a number of times with a pixel being ON or OFF for the fraction of time corresponding to the desired level. For example, if the matrix is scanned $2^6=64$ times during illumination of one color, then 6 bits of gray level color is achieved. Alternatively, instead of the pulse number, the duration of the driving pulse can be changed to control the duration that a pixel is turned on. This pulse modulation method is used in microdisplays, in which a reflective backplane is made using CMOS VLSI chip to provide such high speed operation. Microdisplays are used for head-mounted or projection displays. However, there is no such principle applied to active-matrix direct-view flat-panel display owing to the extraordinarily high demand in operating speed and driving power in transistors.

In area-controlled gray levels method, also known as the dithering method, multiple gray levels can be obtained by controlling the number of sub-pixels constituting one pixel. For example, one pixel is constituted by four or nine sub-pixels and each of the sub-pixels is independently controlled as black or white. This method requires a very large number of pixels and connections, which increase the number of transistors per pixel and cost.

Grayscale methods, when applied to FSC FLC displays, can be achieved in silicon wafer based microdisplay technology owing to the fact that CMOS transistors can be used. CMOS transistors can drive FLC panel at very high speed, such as 4 GHz frame rate. This is because the small chip size of Liquid Crystal on Silicon (LCOS) backplanes, usually less than 1 inch diagonal, effectively suppresses parasitic loading effects inherent in large area large pixel display panels. Fast CMOS circuits can also allow grayscale to be achieved in microdisplays using the bit-plane approach (time-controlled pulse width modulation) through high speed scanning.

However, this approach cannot be applied to direct-view flat-panel FLC displays. For applications like mobile displays or televisions, parasitic loadings are much larger than that in microdisplays. Additionally, the FLC pixels are driven with thin-film transistors, which are less powerful in driving power compared to CMOS transistors. Furthermore, the presence of hysteresis requires special handling in FLC display gray levels. All these factors discourage the adoption of both conventional 1T1C driving scheme and PWM grayscale methods.

Exemplary embodiments of the present disclosure provide a driving scheme for an active-matrix ferroelectric liquid crystal display that utilizes a compact TFT pixel design and is capable of producing continuous, uniform, time-controlled grayscales. This allows for high-quality liquid crystal displays, and in particular can be useful for field-sequential-color and high-resolution direct-view flat-panel displays.

A first TFT of the driving circuit may be used to control the duration that a second or third TFT will be turned on. The duration of the second or third TFT that is turned on is directly proportional to the time that the LCD cell or pixel is turned on or off. Thus, the brightness of a corresponding pixel is controlled indirectly by the first TFT, which in turn is controlled by the data voltage supplied to the pixel.

Four exemplary embodiments providing various manners of controlling the second or third TFT by the first TFT are provided as follows:

According to a first exemplary embodiment, a pixel circuit is provided for a FLC display where each pixel has two transistors and one capacitor. (See, e.g., FIG. 2A-B). A first part of the pixel circuit is a switching transistor, T1, which control the duration between the data line and the capacitive storage. A second part of the pixel circuit has another transistor T2 which is connected to the FLC electrode and the pulsed power source. The power source determines two phases, the initialization phase and the illumination phase. For example, in P-type design, the pulsed power source will start with VSS to discharge the FLC cell for initialization. Then, the power source will switch to VDD during illumination phase. The driving transistor, together with data inside pixel storage capacitor, controls the charging current (P-type)/discharging current (N-type) throughout the illumination period.

According to a second exemplary embodiment, a pixel circuit is provided in a FLC display where each pixel has two transistors and one capacitor. A modification relative to the first exemplary embodiment is made in that a ramping signal is connected to the pixel storage capacitor. (See, e.g., FIG. 4A-B). The pixel circuit operates as a pure voltage-to-PWM convertor. Conventional LCD displays use signal magnitude, for example, voltage magnitudes, to represent display data information. This second exemplary embodiment, on the other hand, provides a driving circuit for pixels in FLC displays that respond to electric signal polarity by converting voltage magnitude representations to pulse width modulation representations. ESH FLC cells respond to signal polarity but not voltage magnitude. Thus, by adjusting the pulse width of the PWM signal, different gray scales may be created. For example, when the pulse width is high for 25% of the pulse duration and low for 75% of the pulse duration, a gray level of 64 out of 256 grayscales is generated. Further, it will be appreciated that although a "ramping signal" is described in connection with this exemplary embodiment, other types of control signals may be used.

Figure 6A:
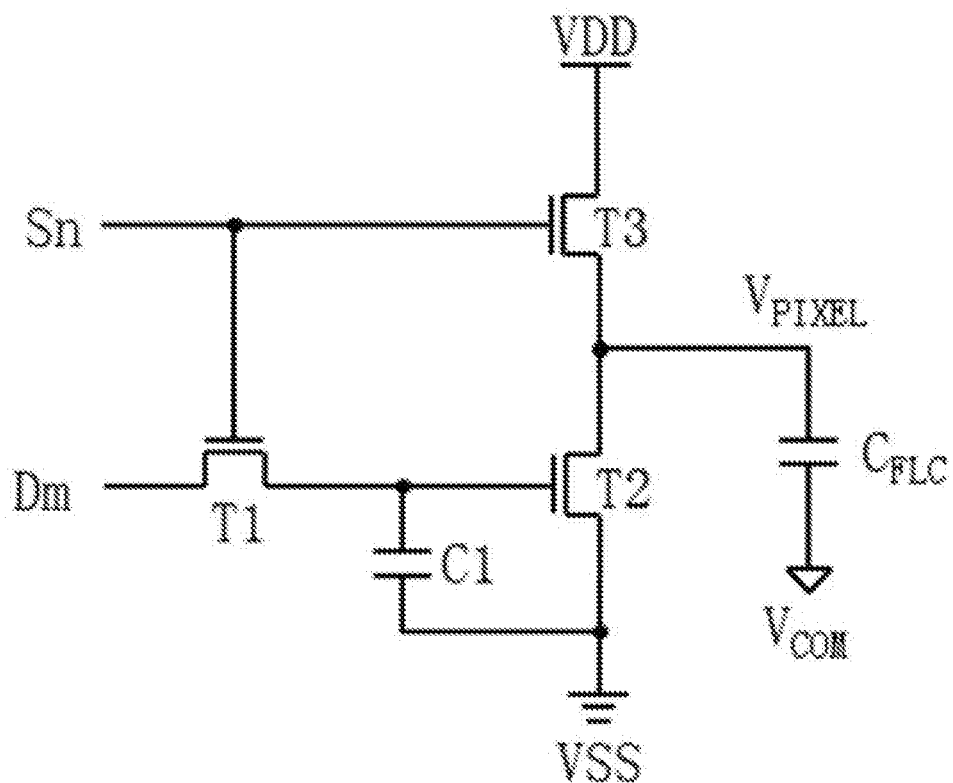
FIG. 6A-B provide yet more exemplary schematic diagrams of driving circuits according to some embodiments of the disclosure.
Figure 6B:
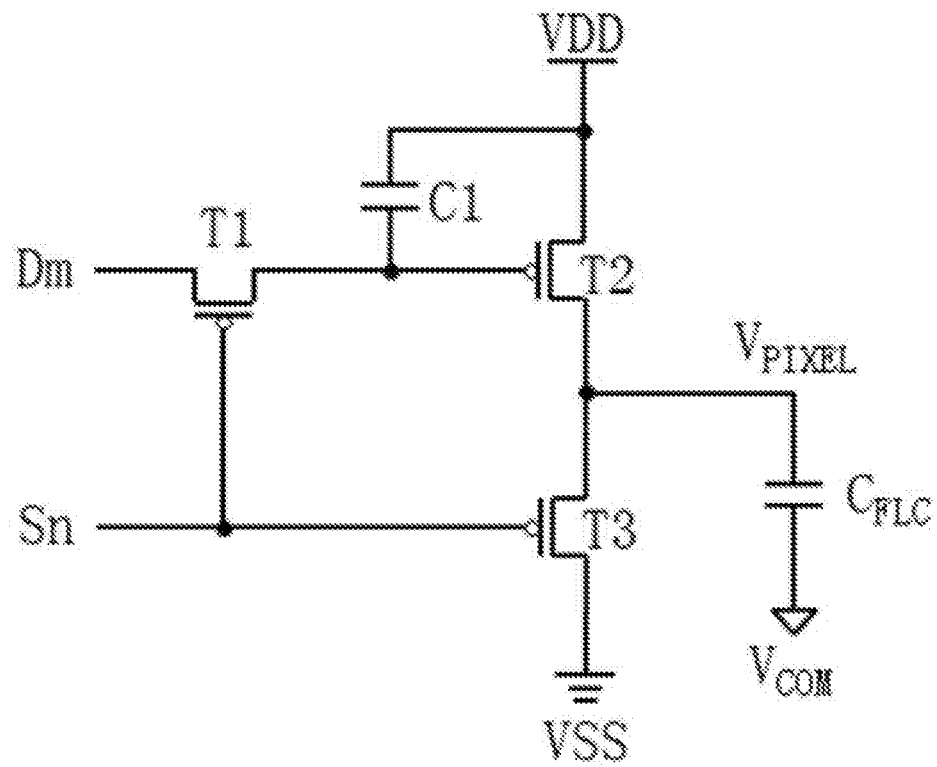

According to a third exemplary embodiment, the pulsed power source (e.g., as implemented in the first exemplary embodiment) is replaced by two separated power sources, VDD and VSS. (See, e.g., FIG. 6A-B). Further, the pixel circuit includes two transistors, T2 and T3, in addition to the switching transistor T1, connected to the FLC electrode. One of the transistors presets the FLC cell to an initial state, and the other one controls the charging current (P-type)/discharging current (N-type) throughout the illumination period. It will be appreciated that in both the first exemplary embodiment and the third exemplary embodiment, the grayscale generation principle is the same. During the illumination stage, the second part of the pixel circuit functions as a voltage-controlled current source/drain. The ESH FLC pixel switches between the black and white states depending on polarity of electric field applied across the liquid crystal devices. In FIG. 6A-B, by setting $V_{COM}$ half way between VDD and VSS, the cell will initially charge to a preset state, and switch to the other state according to the charge/discharge rate. This switching effect will occur once the potential across the FLC reaches the threshold voltage of the ESH FLC cell. The grayscale generation mechanism is based on a hybrid of "amplitude-controlled method" and "time-controlled method," with the switching operation dependent on the threshold voltage of the ESH FLC.

According to a fourth exemplary embodiment, three transistors and a capacitor are used with a ramp signal. (See, e.g., FIGS. 10A-B and 11A-B). This ramp signal is connected globally in the backplane, serves as a command signal for the illumination period, and synchronizes with the color sequential backlighting unit. After all pixels are refreshed with corresponding data, the ramping signal starts, and together with the pixel circuit, the pixel circuit operates as a pure voltage-to-PWM convertor. The PWM output is coupled to the FLC electrode, and the grayscale is controlled by the fraction of ON-OFF period. For this fourth exemplary embodiment, the driving scheme only has to scan the panel once, unlike the repeated scanning utilized by bit-plane PWM techniques. Accordingly, this speed relaxation is suitable for thin-film transistor technology in direct-view displays. The output of the pixel circuit is digitized, and therefore, the grayscale generation mechanism is time-controlled.

Embodiments of the disclosure thus provide novel driving schemes for active-matrix FLC displays capable of producing linear, continuous grayscales based on analog input voltage for realize field sequential coloring. These embodiments, for example, may be adopted in direct view displays using thin-film transistors technology. Although the illustrative embodiments provided will be described for LCD displays with pixels arranged in an array structure to form a display. Embodiments of the disclosure are also useful in other applications, such as active shutter glasses for 3D displays, or other applications that utilize a liquid crystal shutter array comprising pixels with non-emissive liquid crystals that function like shutters that control the ON/OFF of the pixels.

FIG. 1 is an exemplary illustration of the basic optics mechanism of switching electrically suppressed helix (ESH) ferroelectric liquid crystal (FLC) cell into bright and dark states. Depending on the polarizer arrangement, State 1 and State 2 can be either bright or dark states. For simplicity of explanation, State 1 will be defined as the dark state while State 2 will be defined as the bright state. Referring to FIG. 1, the backlight provides light in all directions, and the polarizer is used to select light in a certain direction. In certain embodiments, the polarizer may not be necessary if light from the backlight may be generated in the direction of interest. After the light passes through the polarizer, it becomes polarized light and passes through the liquid crystal layer or LC layer. After the polarized light passes through the LC layer, it is either blocked by the analyzer (State 1) or passes through the analyzer (State 2). The state of the LC layer determines whether or not the light passes through the analyzer. In certain embodiments, applying bias, for example, voltage, to the LC layer allows light to pass through the analyzer while removing the applied bias blocks light from passing through the analyzer. In other embodiments, the opposite relationship holds. In FIG. 1, the liquid crystal cell only carries two states, the bright state and the dark state. When the LC layer is an FLC and the voltage different across the cell is larger than the FLC's threshold, the FLC switches to the corresponding state. The FLC possesses polarity due to its ferroelectric property, meaning that whether a bright or dark state is achieved is dependent on the voltage polarity applied across the cell in addition to the polarizers' arrangement. This allows the backlight to be switched ON only during a relevant PWM period (unlike conventional LCD displays, which are required to constantly keep the backlight in the ON state).

Exemplary embodiments of the disclosure address how to bias or drive the LC layer of FIG. 1. A first TFT is used to control the duration that a second or third TFT will be turned ON. In some cases, the duration of the second or third TFT that is turned ON is directly proportional to the time that the LCD cell or pixel is turned ON or OFF. In effect, the brightness of the pixel is controlled indirectly by the first TFT, which in turn is controlled by the data voltage supplied to the said pixel. Depending on how the second or third TFT is controlled by the first TFT, certain advantages are realized.

Figure 2A:
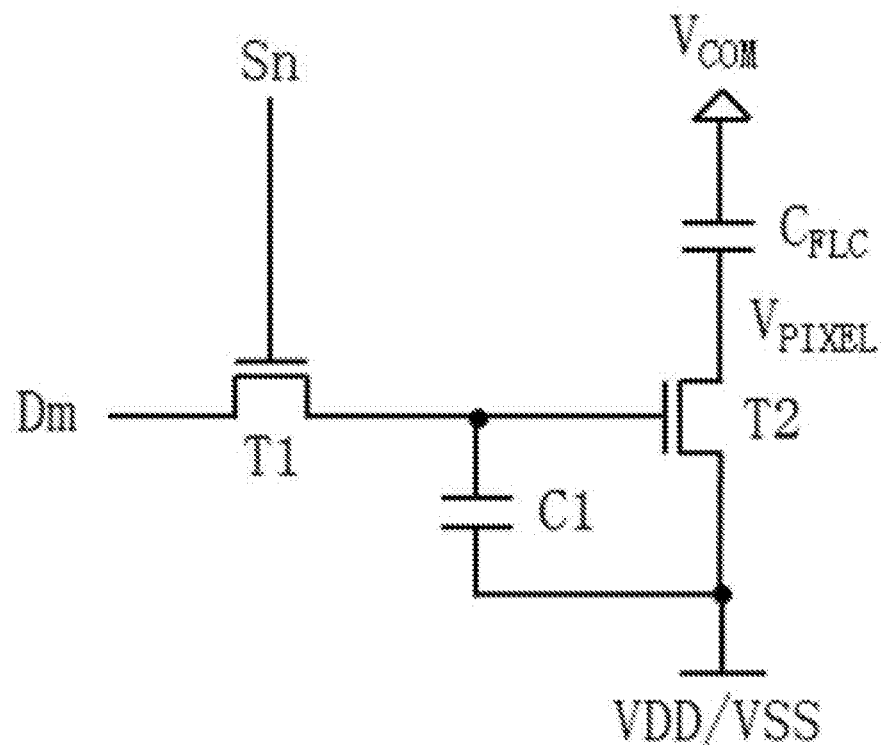
FIG. 2A-B are exemplary schematic diagrams of driving circuits according to some embodiments of the disclosure.
Figure 2B:
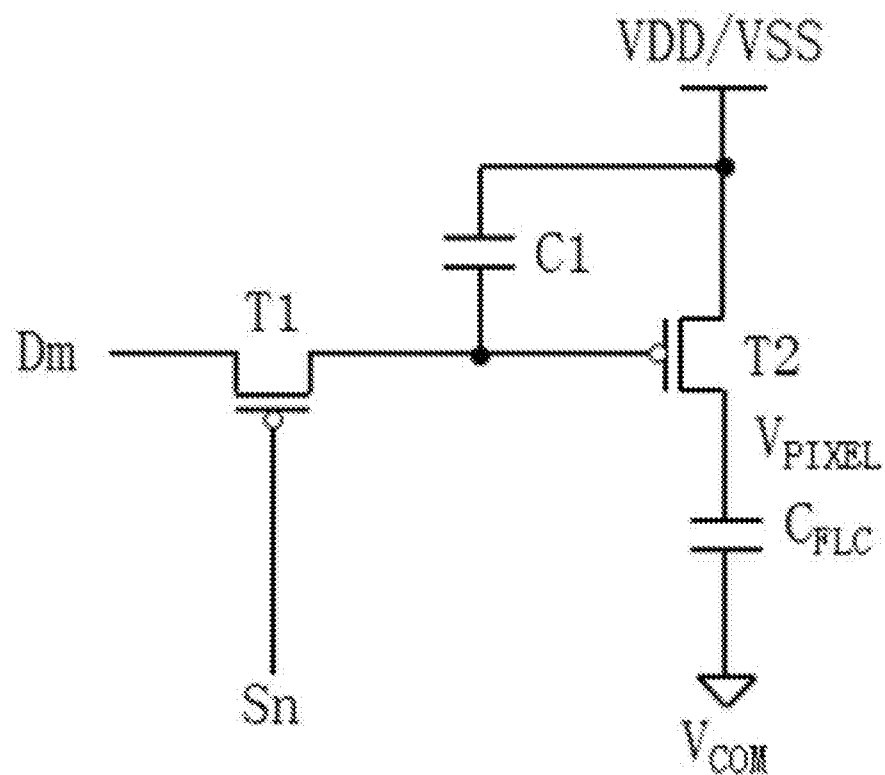

In exemplary embodiments illustrated in FIG. 2A-B, a pixel circuit is provided in an FLC display where each pixel has two transistors (T1 and T2) and one capacitor (C1). FIG. 2A provides an N-type design schematic while FIG. 2B illustrates a P-type design schematic. The pixel circuit is driven by a data signal (Dm), scan signal (Sn) and a pulsed power source (VDD/VSS). The FLC cell is modeled as a capacitor ($C_{FLC}$) sandwiched between the pixel electrode ($V_{PIXEL}$) and the common voltage electrode ($V_{COM}$). A first part of the pixel has a switching transistor, T1, which controls the duration between the data signal (Dm) and the capacitive storage (C1). A second part of the pixel has a second transistor T2 which is connected to the FLC electrode (one side of the $C_{FLC}$ capacitor) and a pulsed power source (VDD/VSS). The pulsed power source determines two phases, the initialization phase and the illumination phase. For example, in the exemplary P-type design of FIG. 2B, the pulsed power source will start at VSS to discharge the FLC cell for initialization. The pulsed power source starts by switching to VSS and scan signals of the whole panel will be asserted in order to initialize the FLC cell to a preset state. Then, the scan (Sn) and data (Dm) signals will scan through the panel progressively to update pixel storages with the corresponding display data. Afterward, in the illumination stage, the pulsed power source will be switched to VDD, and at the same time, data stored in C1 controls the current flowing through the driving transistor (T2), in which the current amplitude further controls the rate of change of $V_{PIXEL}$ as shown in the simulated waveforms in FIG. 3A-D. Thus, in the illumination phase when the power source is switched to VDD, the driving transistor, together with data inside pixel storage capacitor, controls the charging current (P-type)/discharging current (N-type). This embodiment may be referred to as a 2T1C (2 transistors 1 capacitor) scheme.

Figure 3A:
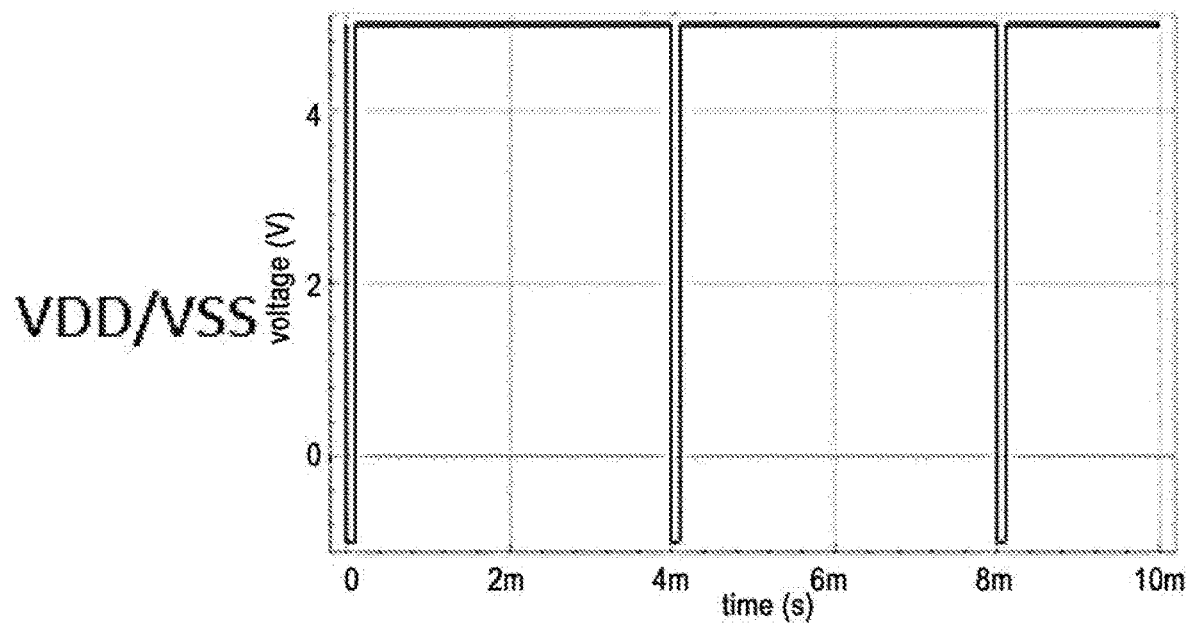
FIG. 3A-D show exemplary signaling techniques and simulation results corresponding to the exemplary schematic of FIG. 2B.
Figure 3B:
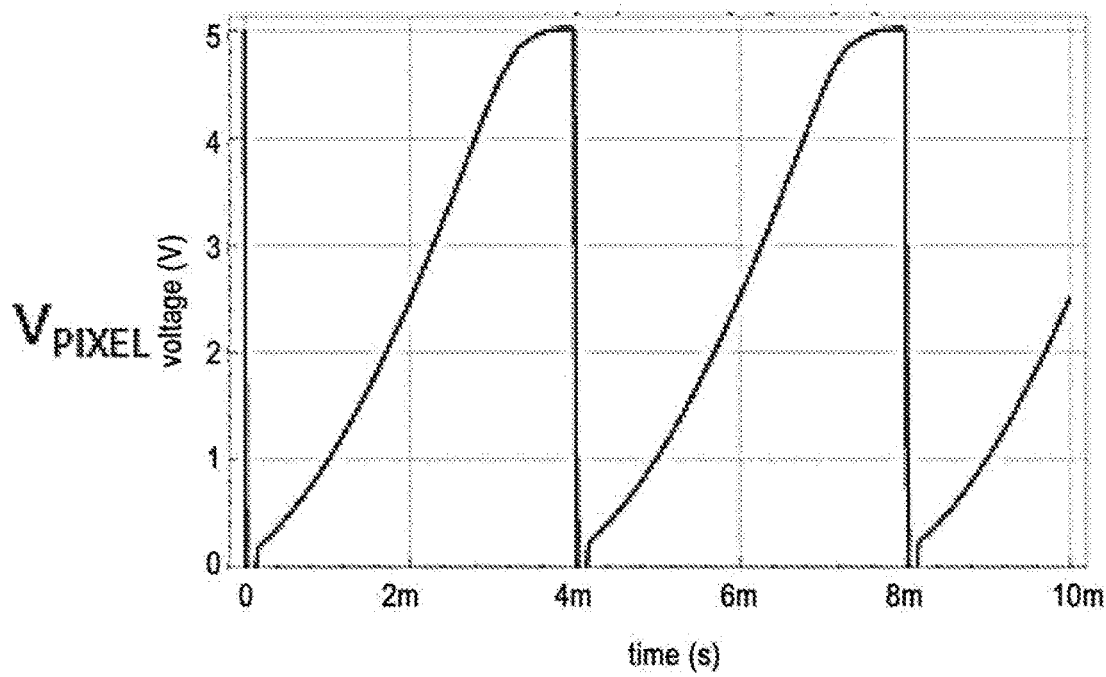
Figure 3C:
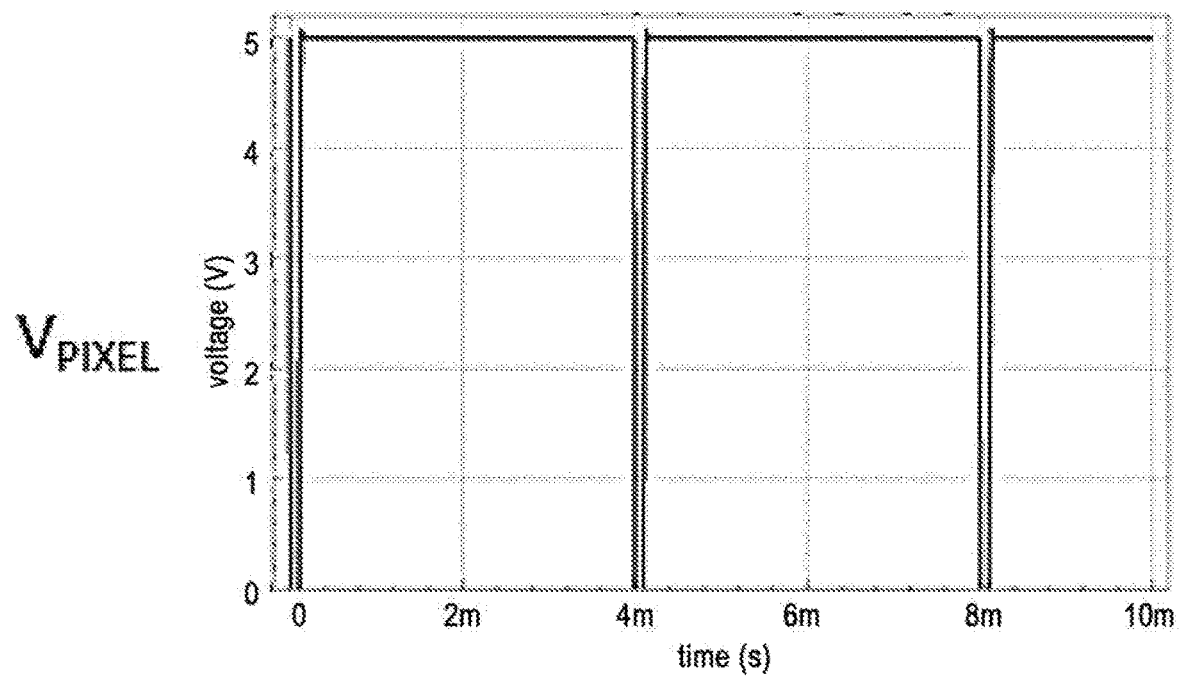
Figure 3D:
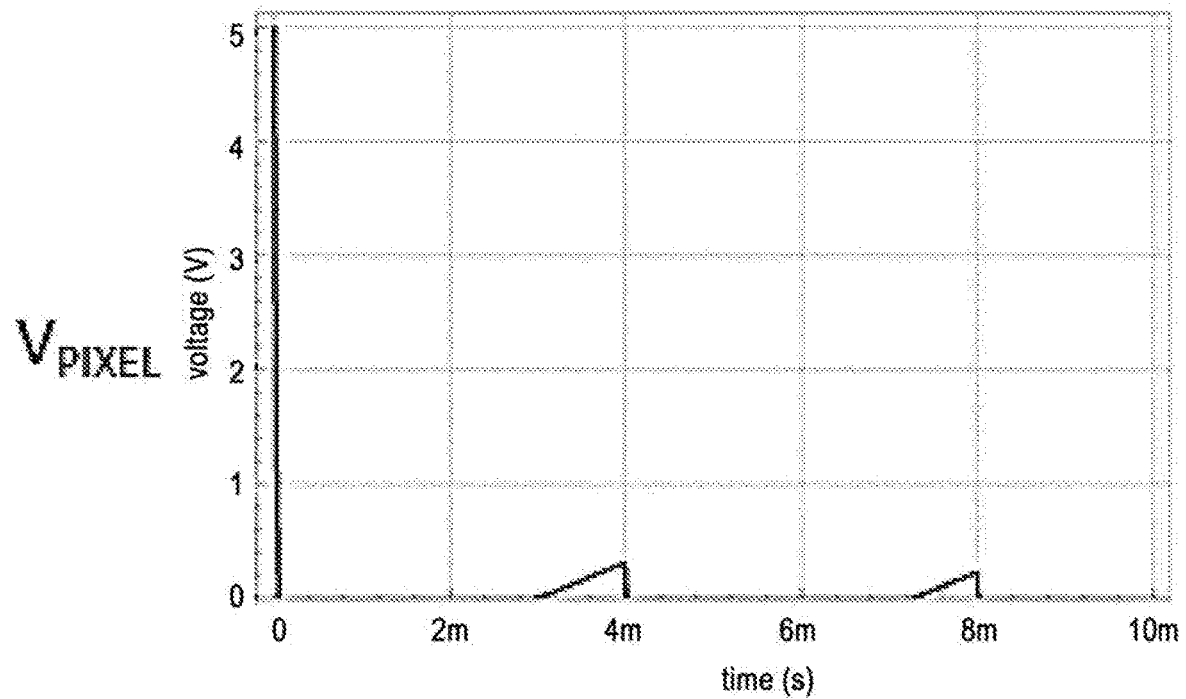

To generate the exemplary signals in FIG. 3A-D, $V_{COM}$ of the P-type cell is 2.5V. When $V_{PIXEL}$ is lower than 2.5V, the pixel is OFF. When $V_{PIXEL}$ is larger than 2.5V, the pixel is ON. The ON/OFF condition of the pixel is therefore controlled by the rising rate of $V_{PIXEL}$. In FIG. 3A, VDD/VSS signal switches to VSS to reset the pixel and then to VDD to generate the pixel charging current. FIG. 3B shows a 50% ON and 50% OFF condition which corresponds to a halftone in grayscale. FIG. 3C shows a 100% ON condition which corresponds to maximum brightness, and FIG. 3D shows a 100% OFF condition which corresponds to total darkness. By controlling the rising slope of $V_{PIXEL}$, different ON/OFF ratios which correspond to different gray levels can be achieved. The intrinsic critical voltage of the FLC may be used as cutoff to control pixel ON/OFF conditions. It will be appreciated that this scheme utilizes the intrinsic critical voltage of the FLC as a cutoff to control the pixel ON/OFF.

Figure 4A:
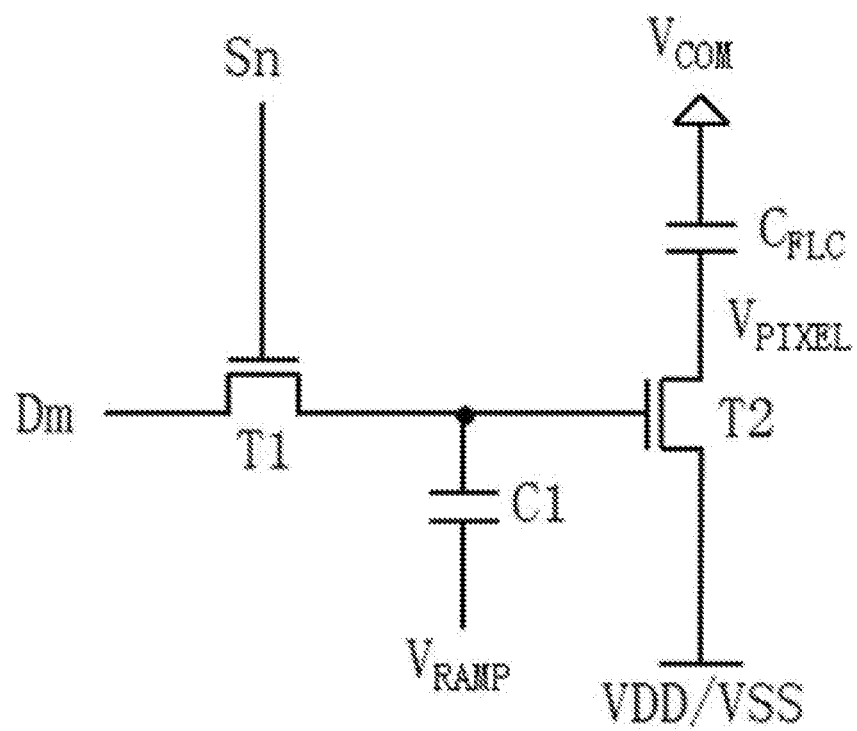
FIG. 4A-B are exemplary schematic diagrams of driving circuits according to some embodiments of the disclosure.
Figure 4B:
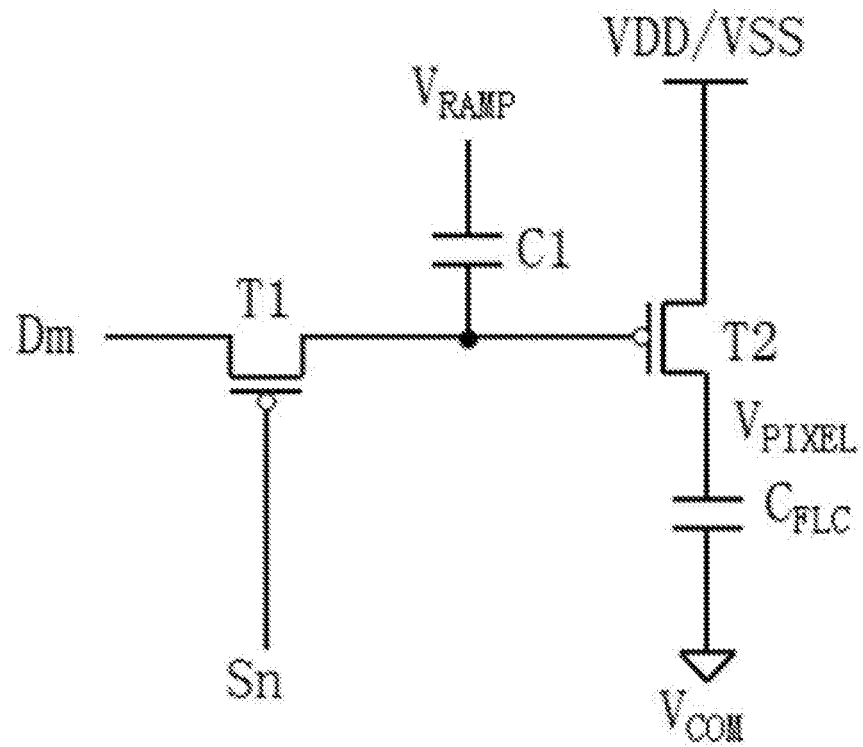

In an exemplary embodiment provided in FIG. 4A-B, a pixel circuit is provided in an FLC display where each pixel has two transistors and one capacitor. In this embodiment, one end of the storage capacitor (C1) is electrically coupled to an additional ramping signal ($V_{RAMP}$), instead of the source of T2. FIG. 4A gives the schematic of exemplary schematic of N-type driving circuit and FIG. 4B provides an exemplary schematic of a P-type transistor. The data signal (Dm), scan signal (Sn), ramp signal ($V_{RAMP}$) and pulsed power supply (VDD/VSS) are connected to the pixel circuit. As in the previous embodiment, the FLC cell is modeled as a capacitor sandwiched between the pixel electrode and the common voltage electrode ($V_{COM}$). The pixel consists of two transistors (T1 & T2) and one capacitor (C1). In comparison to FIG. 2, an additional ramping signal is connected to the pixel storage capacitor. The pixel circuit functions as a pure voltage-to-PWM (pulse width modulation) converter. Further, it will be appreciated that although a "ramping signal" is described in connection with this exemplary embodiment, other types of control schemes may be used.

In reference to the P-type structure in FIG. 4B, transistor (T2), together with the pulsed power source (VDD/VSS), serves as both a driving and reset transistor of the pixel. Thus, because of the absence of discharge circuit, the reset operation of FLC cell is accomplished by the insertion of a dark frame. This is done by updating all pixels with the dark-state data in the beginning of each frame. Owing to such additional reset frame, the timing requirement of this driving scheme may be higher. In some instances, a switching power source is not commonly recommended for fear of increasing power consumption. Additionally, increased switching may introduce charge sharing to the pixel voltage ($V_{PIXEL}$) and may affect the gray level accuracy. The signals and simulation of operating the exemplary P-type design is shown in FIG. 5A-E.

Figure 5A:
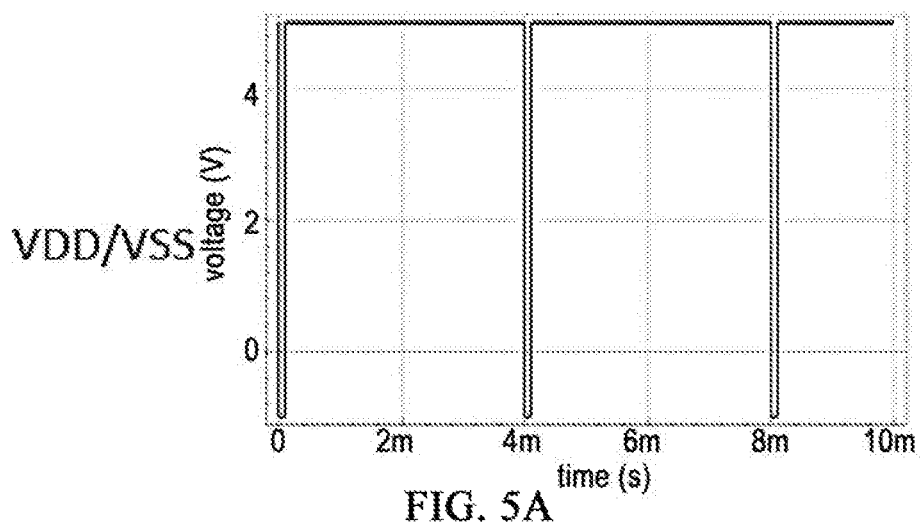
FIG. 5A-E provide exemplary signals and simulations corresponding to the exemplary schematic of FIG. 4B.
Figure 5B:
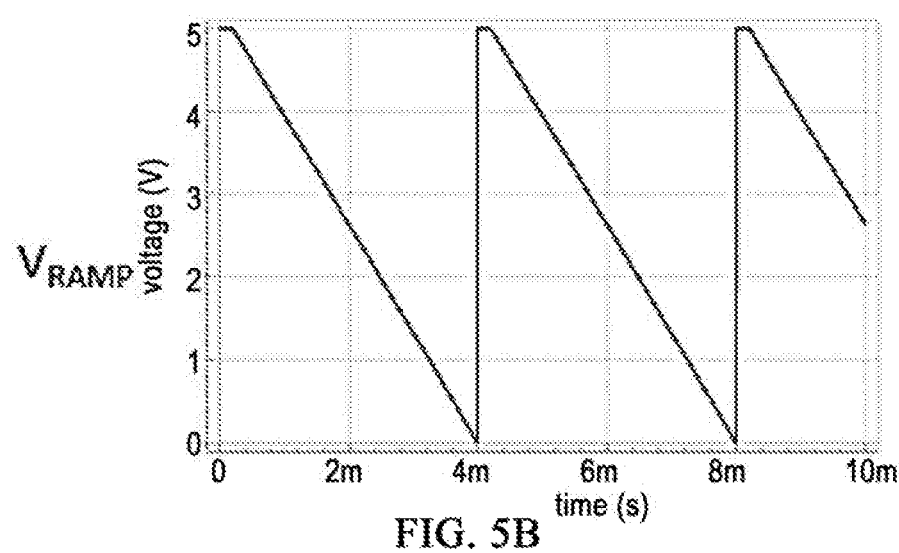
Figure 5C:
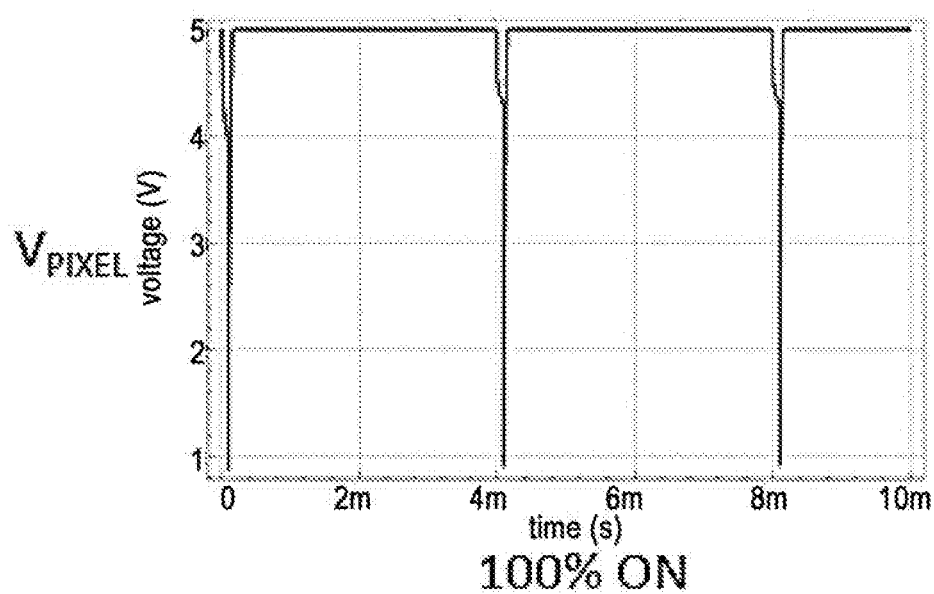
Figure 5D:
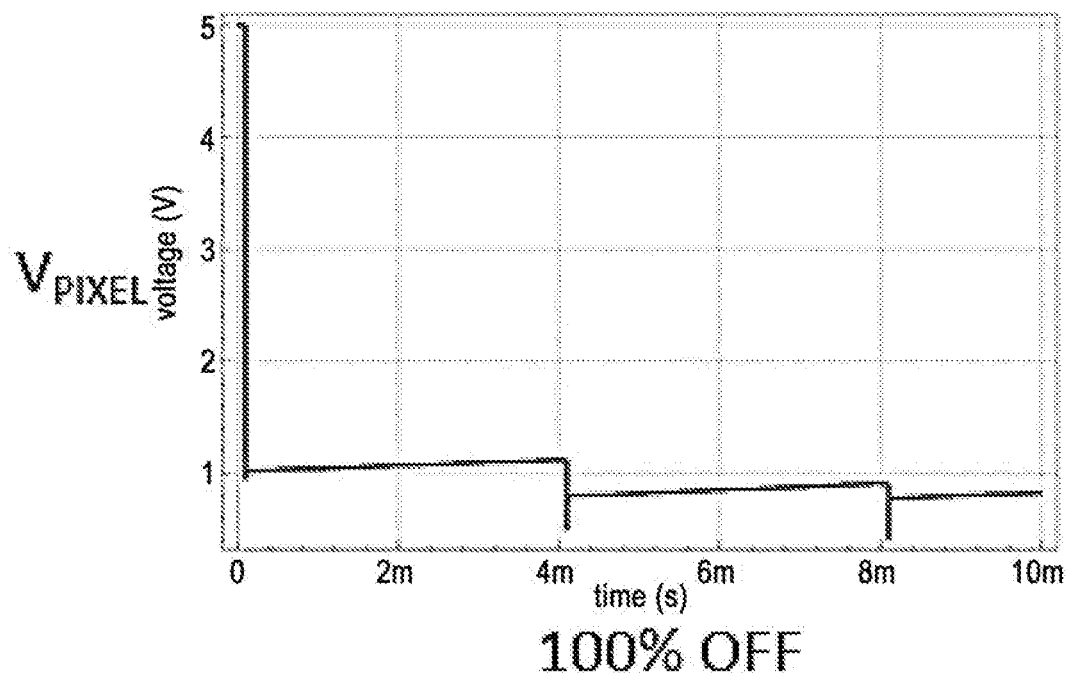
Figure 5E:
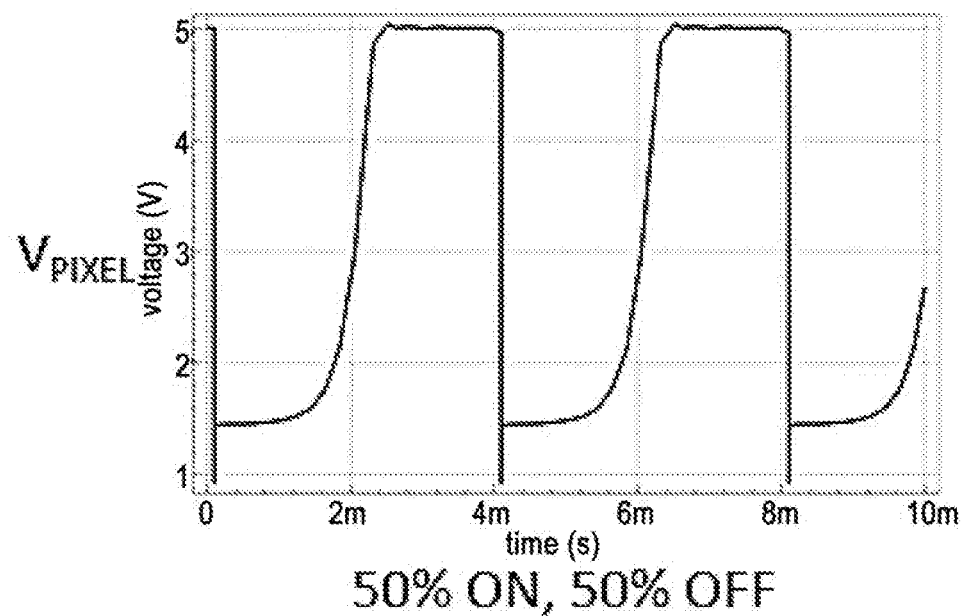

FIG. 5A-E were generated with VCOM value of 2.5V. Thus, when $V_{PIXEL}$ is lower than 2.5V, the pixel is OFF, and when larger than 2.5V, the pixel is ON. FIGS. 5A and 5B provide signaling conditions. In a 100% ON condition, $V_{PIXEL}$ takes the form provided in FIG. 5C. In the 100% OFF situation, $V_{PIXEL}$ takes on the form provided in FIG. 5D. In the half-tone grayscale condition, $V_{PIXEL}$ takes on the form provided in FIG. 5E. It will be appreciated that this scheme utilizes the ramp signal to generate a digitized PWM to control the pixel ON/OFF (in other words, reliable control for the on-off condition of the pixel is provided at the TFT level—i.e., by the on-off status of transistor T2).

The two transistor driving structures shown in FIGS. 2A-2B and 4A-4B provide relatively large pixel aperture, which is beneficial to high pixel density applications. The two-transistor structures also enable brighter displays. The three transistor driving structures that will be described in further detail below with regard to FIGS. 6A-6B, 10A-10B and 11A-11B have a dedicated transistor for the reset operation for each pixel, so stable operation is achieved without AC power (i.e., without the aforementioned VDD/VSS signal). The three transistor configurations thus provide for lower power consumptions (with potentially lower aperture and less brightness).

In exemplary embodiments of FIG. 6A-B, schematic structures of pixel circuits with two equivalent structures constructed with N-type transistors and P-type transistors are provided. The data signal (Dm), scan signal (Sn) and two separated power supply terminals VDD and VSS are connected to the pixel. The FLC cell is modeled as a capacitor sandwiched between the pixel electrode and the common voltage electrode ($V_{COM}$). The pixel circuits include three transistors (T1-T3) and one capacitor (C1). In FIG. 6, the second part of the pixel has two transistors T2 and T3 connected to the FLC electrode. One of the transistors presets the FLC cell to an initial state and the other one controls the charging current (P-type)/discharging current (N-type) throughout the illumination period. This embodiment may be referred to as a three transistors and one capacitor (3T1C) scheme.

Figures 7A, 7B, 7C:
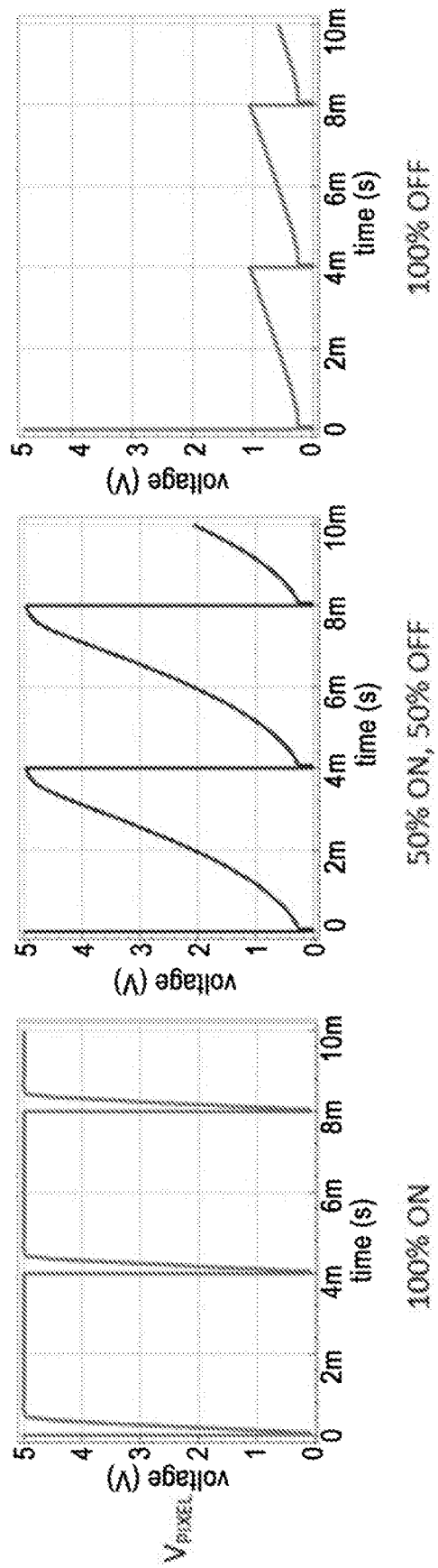
FIG. 7A-C are exemplary signals and simulation results of driving circuits corresponding to the exemplary schematic of FIG. 6B.

In FIG. 6B, the pulsed power supply, as provided in FIG. 2B and FIG. 4B, is replaced by two separate DC supplies, and an extra transistor (T3) is added to control the reset operation. The scan (Sn) and data signals (Dm) will first update the pixel by switching on T1 and T3. The data voltage will pass through T1 onto the pixel storage capacitor C1. At the same time, T3 is turned ON by the scan signal (Sn) to preset the FLC cell into an initial state, for example, the dark state. After this data-update process, the scan line will be turned off. For the rest of the frame before the next update comes in, data stored in C1 controls the current flowing through the driving transistor (T2), in which the current amplitude further controls the rate of change of $V_{PIXEL}$, as shown in the simulated waveform in FIG. 7, and the optical state of the FLC cell.

Figure 8:
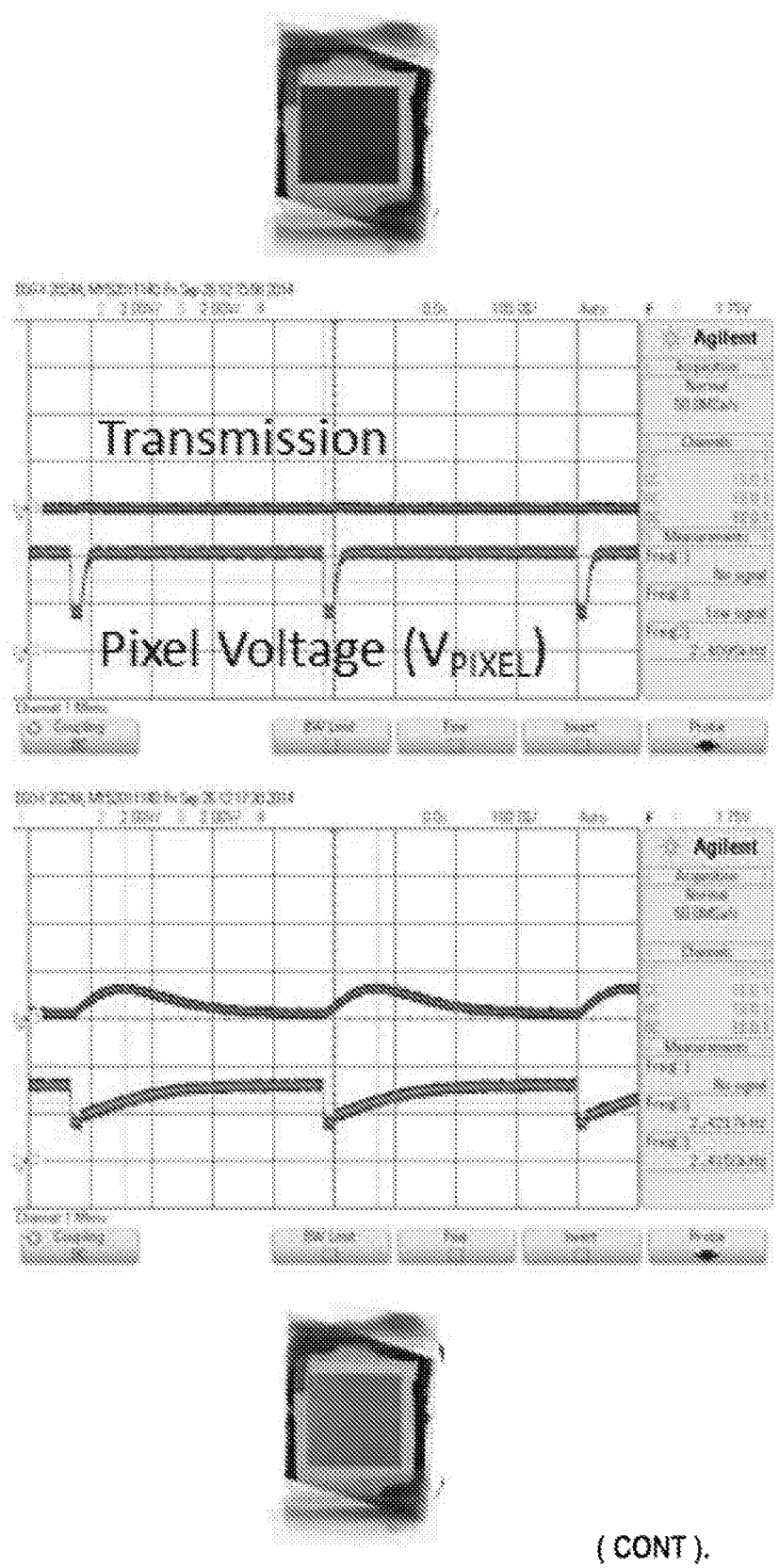
FIG. 8 shows exemplary transmission and pixel voltage characteristics of an FLC pixel according to some embodiments of the disclosure.
Figure 9:
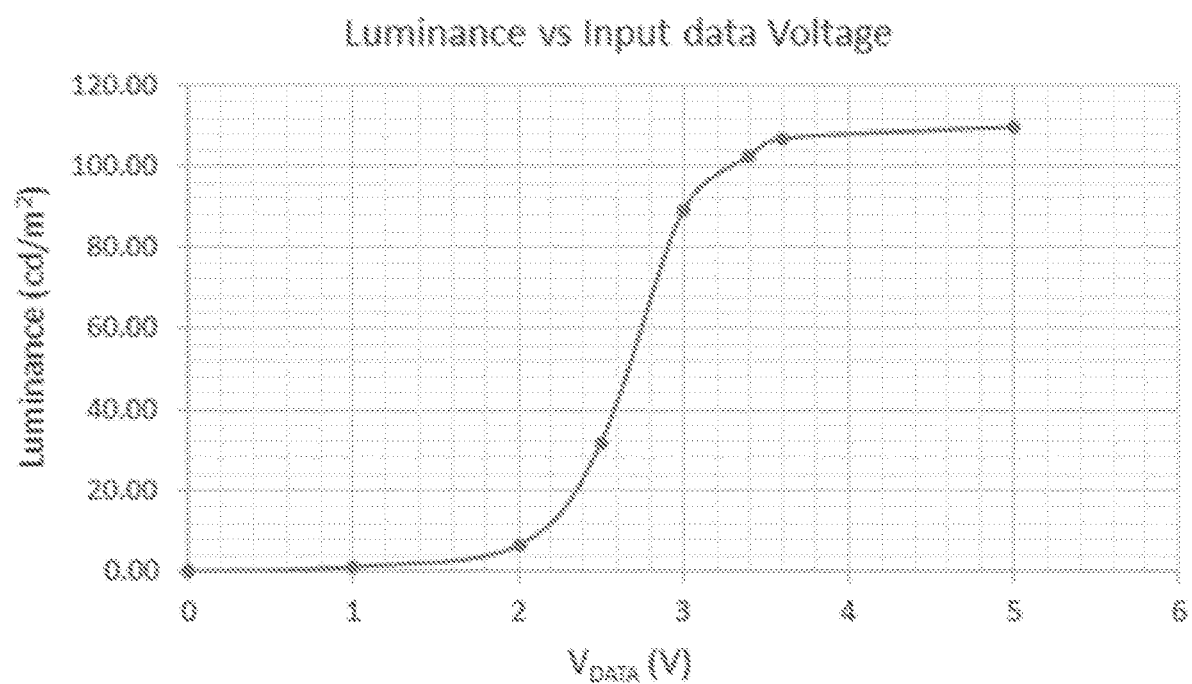
FIG. 9 shows exemplary luminance versus input data voltage according to some embodiments of the disclosure.

A first exemplary prototype circuit was fabricated based on the pixel structure embodiment of FIG. 6A-B. The corresponding output signal was coupled to a FLC test cell. FIG. 8 shows the measured pixel voltage and the resulted transmission corresponding to different gray levels. As charging rate of the pixel voltage increases, the transmission of the FLC increases in both the base amplitude and the high-to-low ratio. In some instances, this suggests that the gray scales are generated base on hybrid domain-size controlled and time-controlled mechanisms. By applying different data voltages, FIG. 8 shows that different pixel outputs (Vpixel, lower line) were achieved as evidenced in the different $V_{PIXEL}$ curves. Additionally, instantaneous transmission was observed as evidenced in the transmission curves, and different gray levels (corresponding to optical performance) were observed as evidenced by the corresponding images. FIG. 9 shows transmission voltage characteristic measured by the fabricated prototype, showing that the luminance is continuous with respect to the input data voltage. In certain embodiments, this implies that the grayscale is analog and continuous in nature. The relationship realized is a nonlinear gamma curve. In certain embodiments, linear gray levels can be achieved using proper gamma corrections to the input data signals.

Using the structure according to the exemplary configurations of FIG. 6, an analog, continuous grayscale is achieved. In some instances, the gray scales are obtained based on the T2 transistor operating in the linear region. In these instances, the quality and reproducibility of the T2 transistor becomes an important practical consideration that affects the feasibility of such a design. Therefore, embodiments of the disclosure further provide a driving method for ESH LCD where transistor T2 is operated under the ON-OFF switching mode instead of the linear region.

Figure 10A:
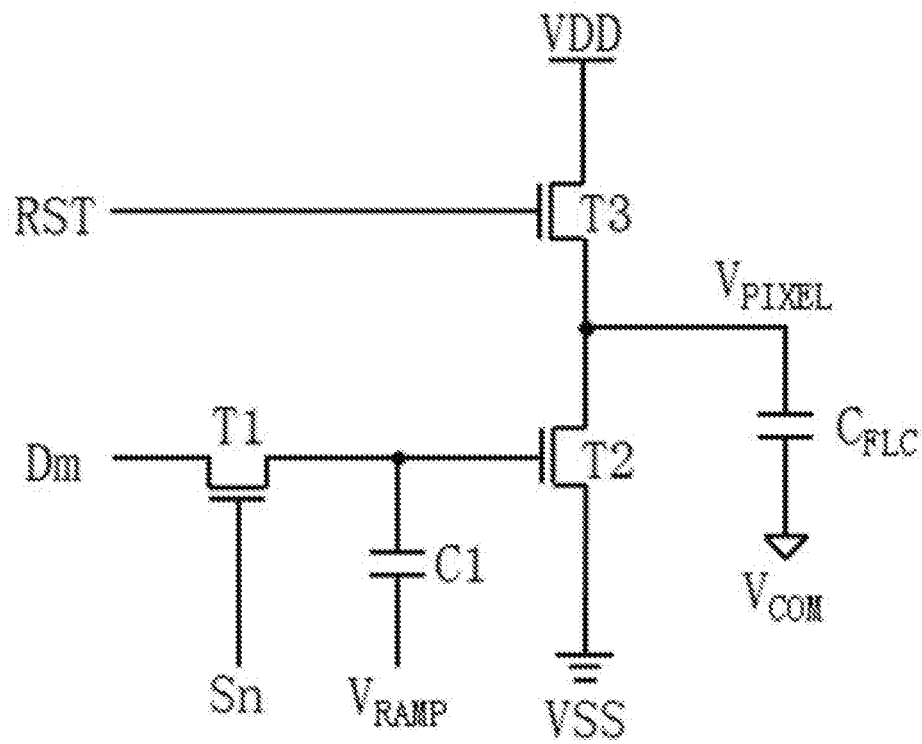
FIG. 10A-B provide exemplary schematic diagrams of driving circuits according to some embodiments of the disclosure.
Figure 10B:
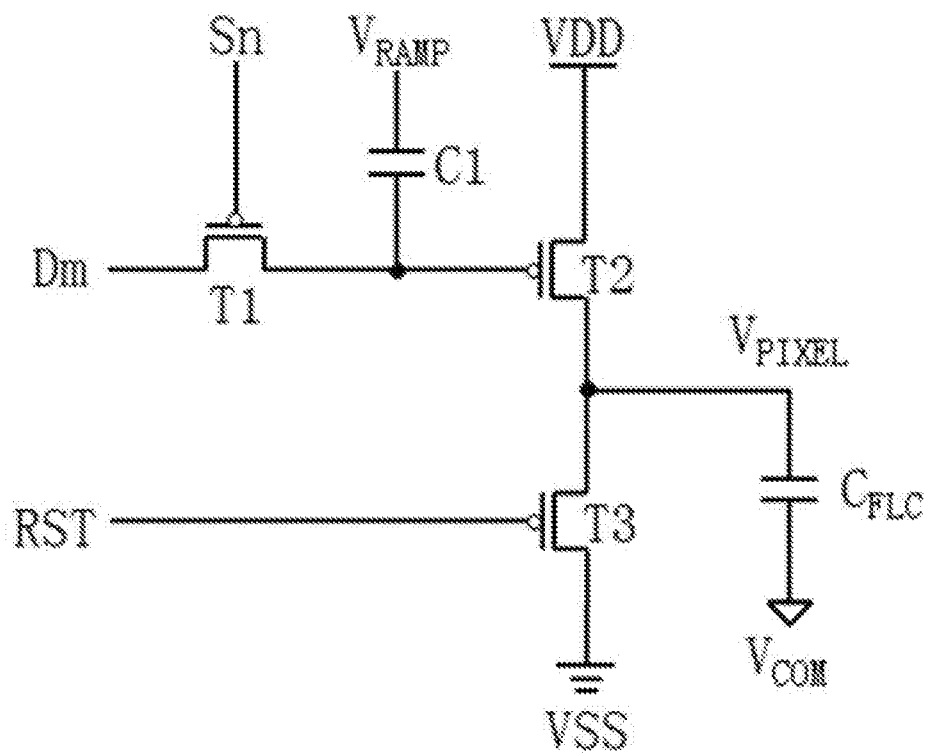
Figure 11A:
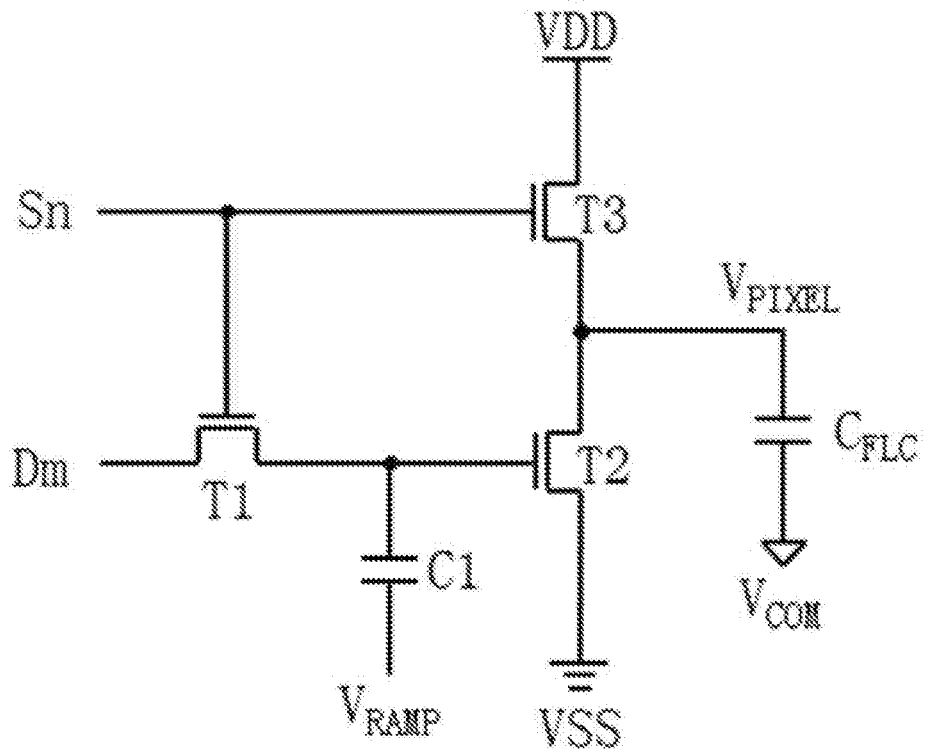
FIG. 11A-B provide exemplary schematic diagrams of driving circuits according to some embodiments of the disclosure.
Figure 11B:
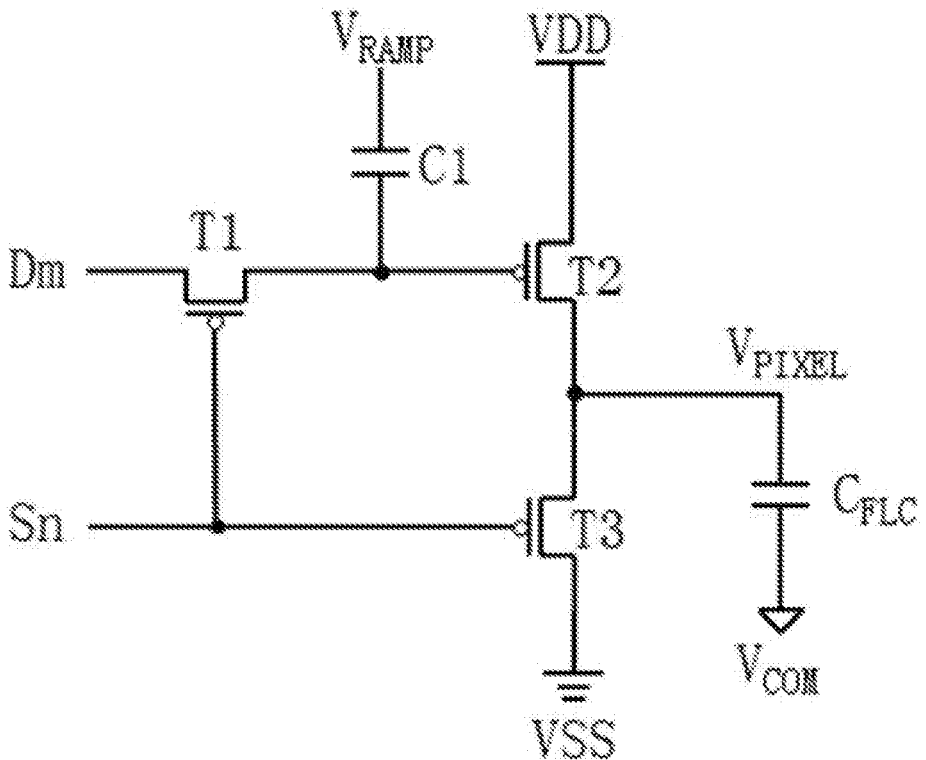

FIG. 10A-B provide additional exemplary schematics of driving circuits in accordance with some example embodiments. Instead of connecting to the source of transistor T2, the storage capacitor (C1) is electrically coupled to an additional ramping signal ($V_{RAMP}$). FIG. 10A gives an exemplary schematic constructed with N-type transistors, and FIG. 10B provides an exemplary schematic constructed with P-type transistors. The data signal (Dm), scan signal (Sn), ramp signal ($V_{RAMP}$), reset signal ($V_{RST}$) and two power supply terminals VDD and VSS are connected to the pixel circuit. As in previous embodiments, the FLC cell is modeled as a capacitor sandwiched between the pixel electrode and the common voltage electrode (VCOM). In some instances, the pixel circuit consists of three transistors (T1-T3) and one capacitor (C1). FIG. 11A-B show potential variants of FIG. 10A-B where the reset signal ($V_{RST}$) is replaced by the scan signal. Further, it will be appreciated that although a "ramping signal" is described in connection with this exemplary embodiment, other types of control schemes may be used.

According to the exemplary schematic of FIG. 10B, transistor T2 operates in an ON-OFF mode. Additionally, capacitor C1 will not respond to AC signal (i.e. the $V_{RAMP}$). Therefore, the amount of charge capacitor C1 holds during the frame is fixed and dependent on data signal (Dm) that is initially fetched in during pixel addressing. At this time, $C_{FLC}$ is pre-charged to an initial voltage through transistor T3. After the $V_{RAMP}$ up-swing, the gate voltage of transistor T2 follows the $V_{RAMP}$ change.

Figure 12:
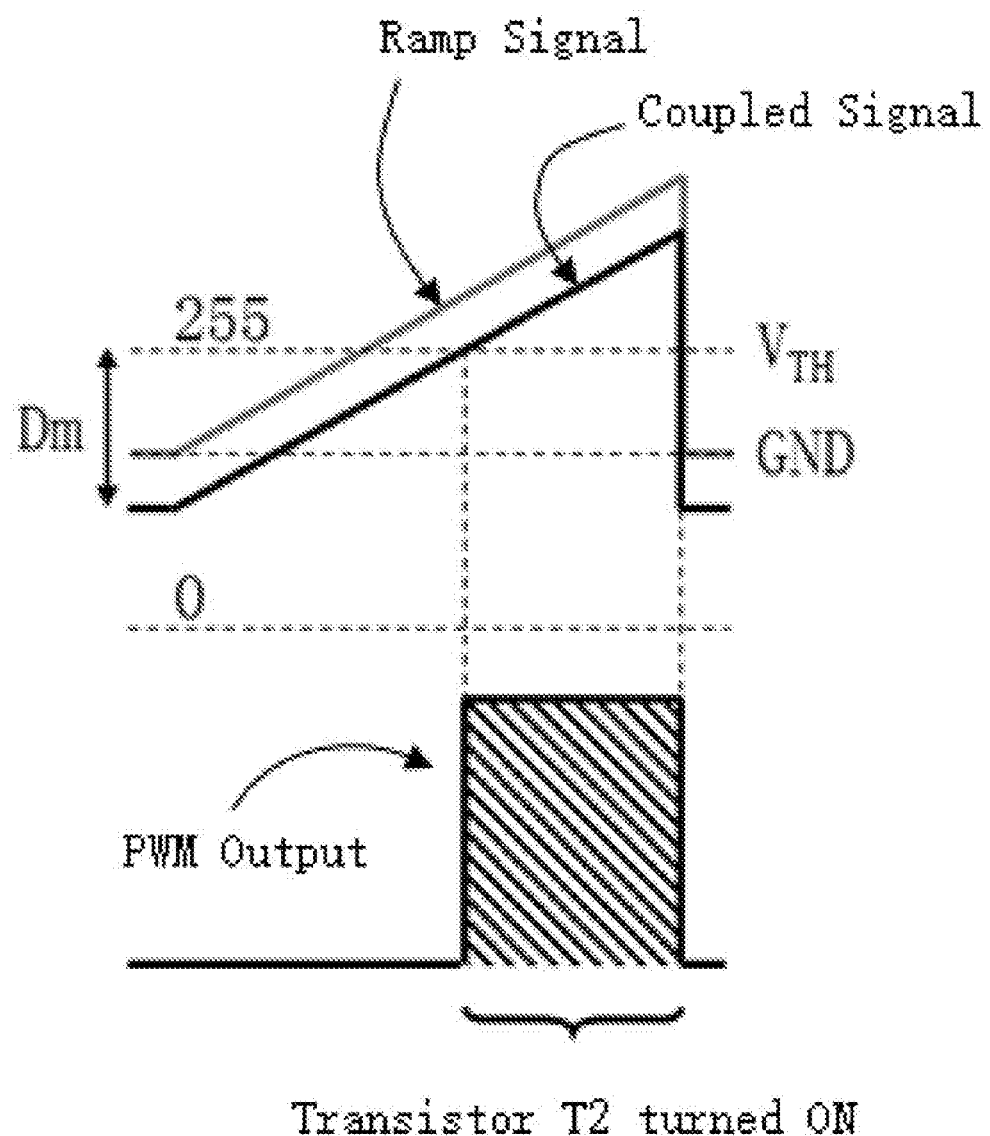
FIG. 12 is an exemplary illustration of gate to source voltage of transistor T2 according to embodiments depicted in FIGS. 10A-B and 11A-B.

FIG. 12 shows exemplary signaling to generate a PWM output for a frame period. For different pixels, the initial voltage at the gate of transistor T2 will shift up or down depending on its pixel data. Namely, the gate of transistor T2 is controlled by a data-dependent ramping signal. Initially, the ramping signal is held while a data signal (Dm) is applied and transistor T2 is OFF. Then, the ramping signal starts rising along with a coupled signal. T2 starts turning ON only when the coupled signal reaches its threshold voltage $V_{TH}$ (T2). While the ramping signal and coupled signal continue to rise (i.e., remains above the threshold voltage), T2 remains ON (due to the coupled signal being larger than the threshold voltage $V_{TH}$ (T2)). In other words, when $V_{GS}$ (T2) reaches $V_{TH}$ (T2), transistor T2 starts turning ON and quickly $V_{GS}$ (T2) swings above $V_{TH}$ (T2) and transistor T2 is fully turned ON. The operation as described ensures that transistor T2 operates in an ON-OFF mode (except for the short transition period from an ON state to an OFF state and vice versa), and is configured to provide a PWM output as depicted in FIG. 12. The ON-time duration is analog and linearly dependent on the data signal. Altering the data voltage will effectively change the ON-OFF ratio of the FLC state within the frame period, and this eventually generates gray levels in time domain perceived by human eyes.

Figure 13A:
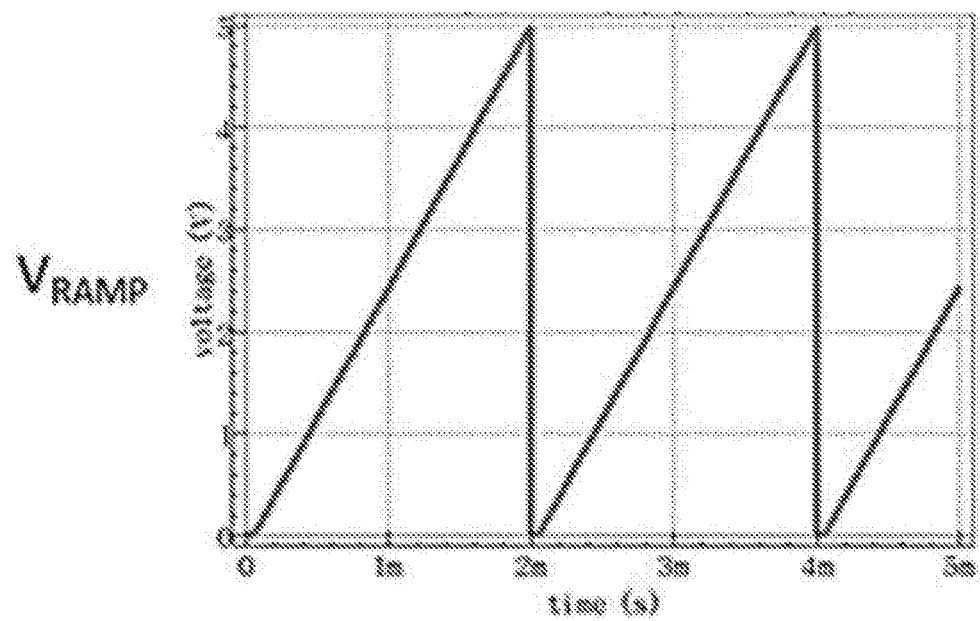
FIG. 13A-D provide exemplary signals and simulation results according to some embodiments of the disclosure.
Figure 13B:
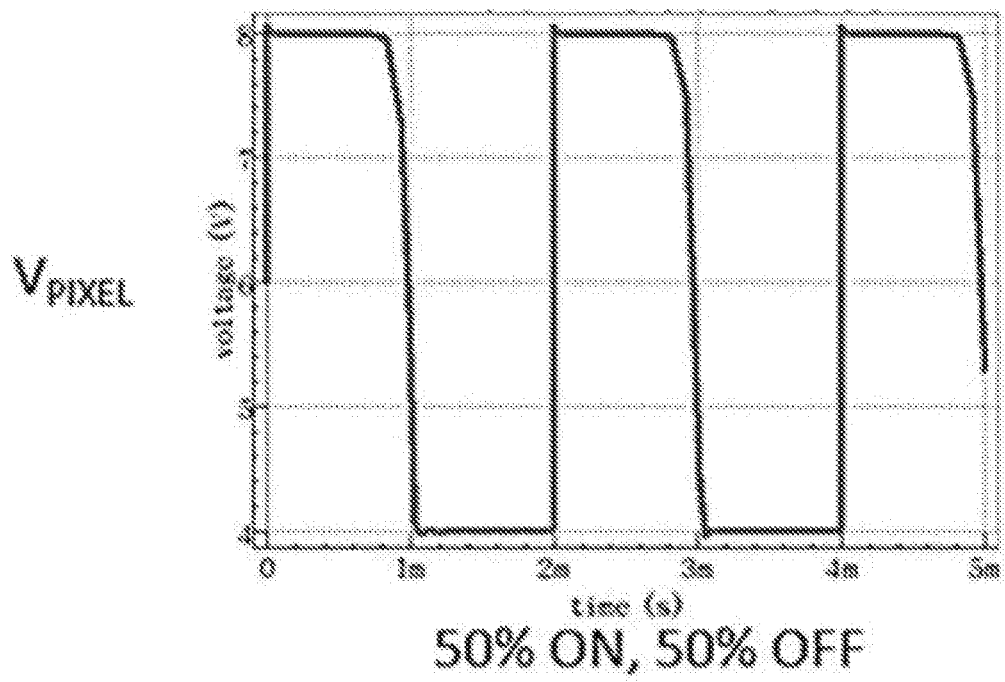
Figure 13C:
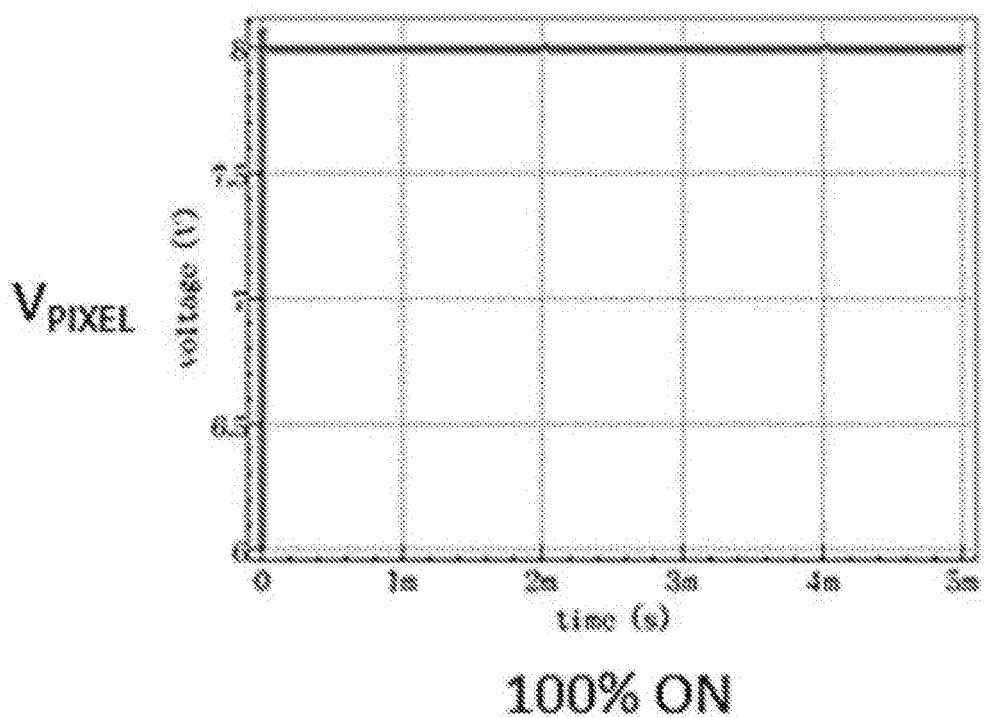
Figure 13D:
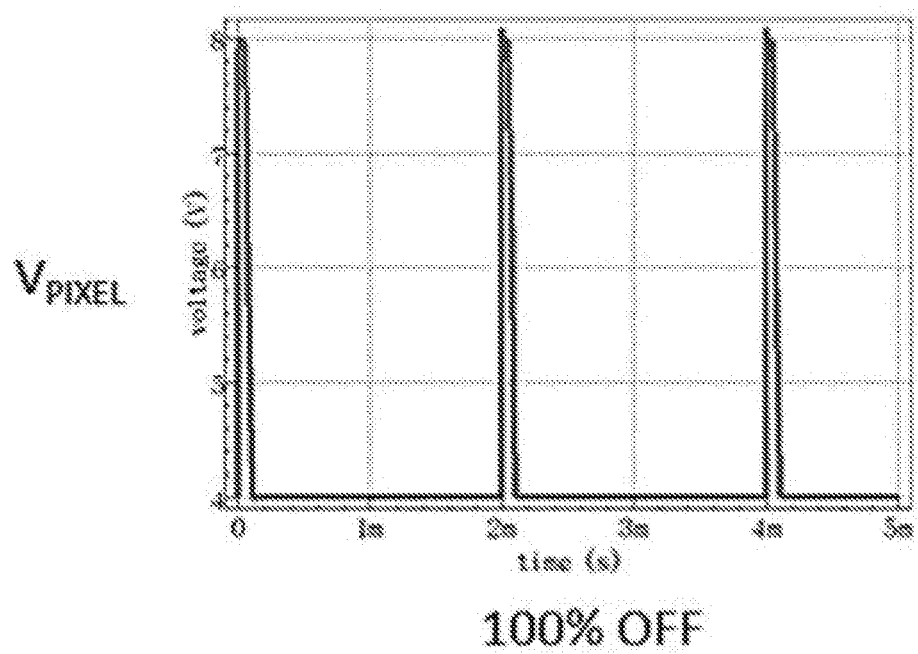

FIG. 13A-D depict an exemplary simulation of the ramping signal and the output pixel voltage ($V_{PIXEL}$) based on exemplary N-type design of FIG. 10A. The output pixel voltage as depicted in the various graphs of FIG. 13B-D is digitized. Depending on the pixel data, the pixel's ON-time can be controlled and gray level generated for the pixel.

Figure 14:
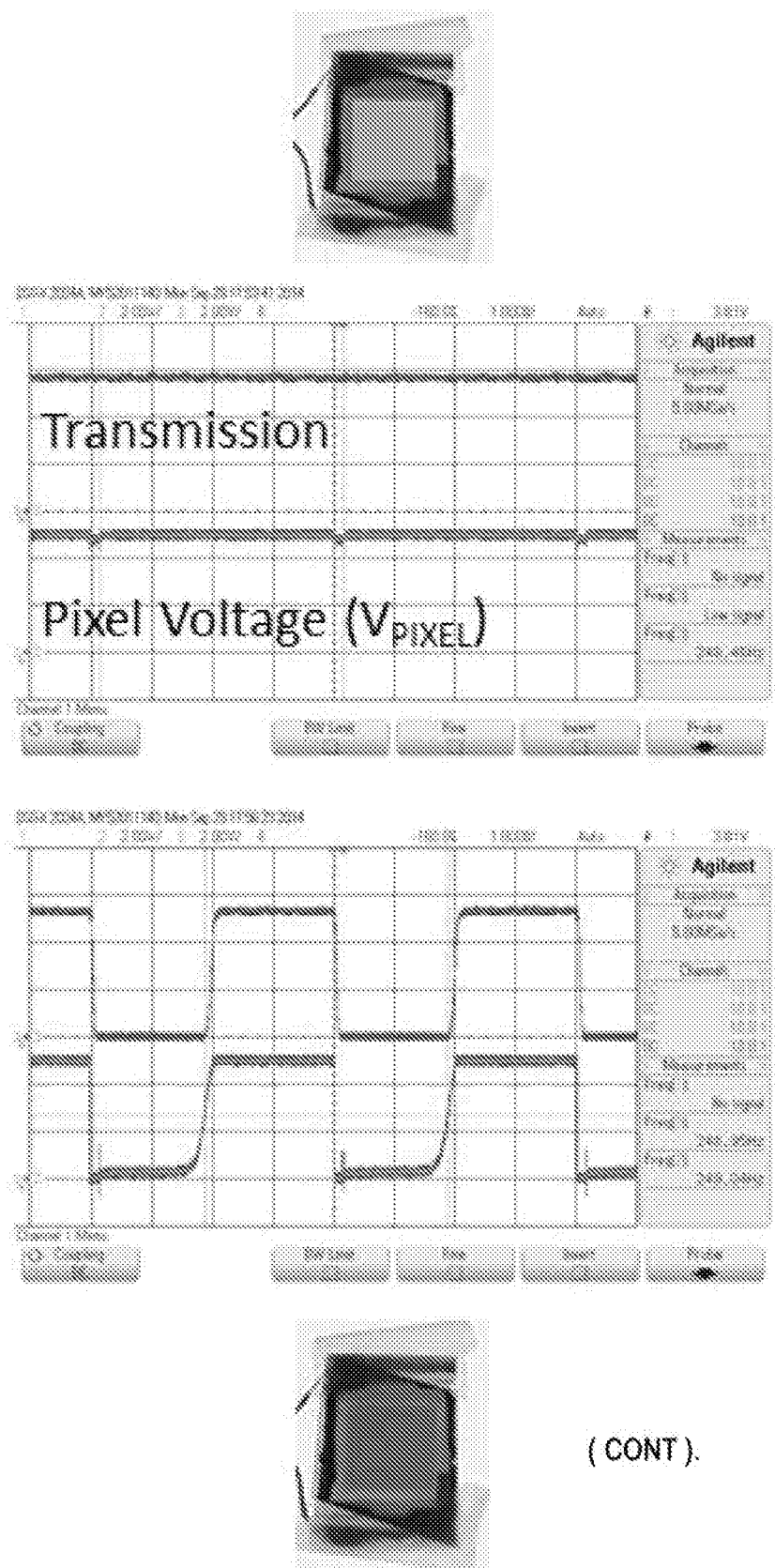
FIG. 14 provides exemplary transmission and pixel voltage characteristics of FLC pixel according to some embodiments of the disclosure.
Figure 15:
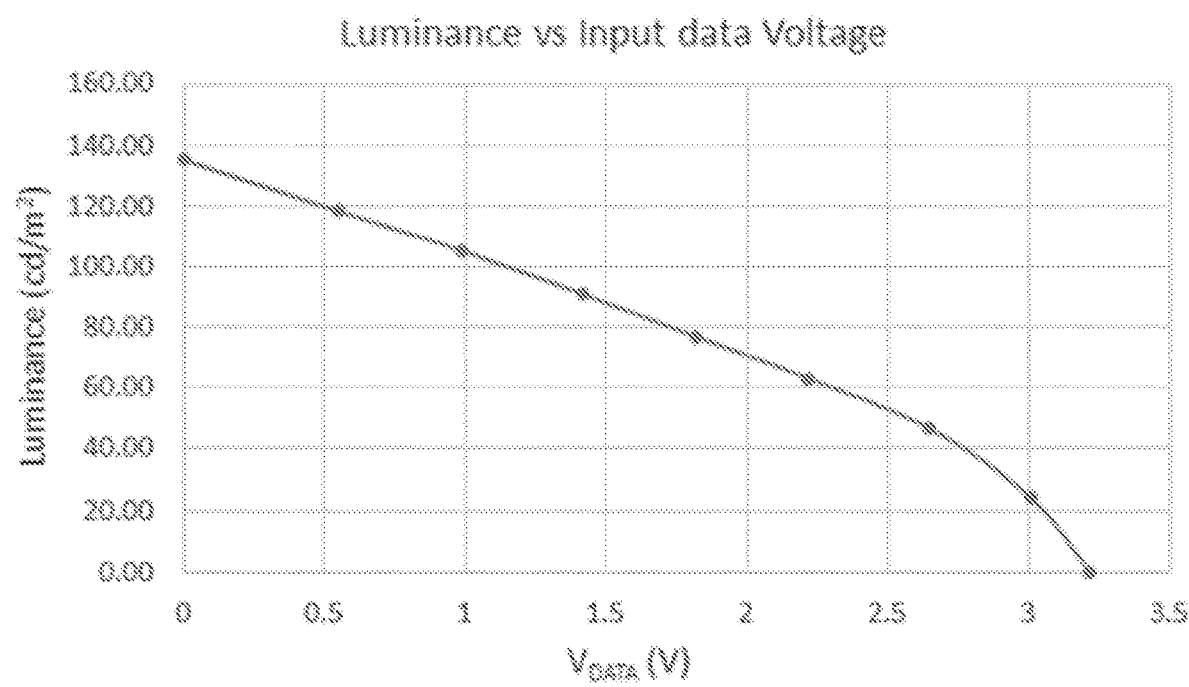
FIG. 15 is an exemplary illustration of luminance versus input data voltage characteristics according to some embodiments of the disclosure.

A second exemplary prototype circuit was fabricated based on the pixel structure embodiment of FIG. 10A. This second exemplary prototype circuit was tested, and FIG. 14 shows the transmission and pixel voltage relation. The result was captured for an FLC cell showing different grayscales as a function of the data voltage. FIG. 15 shows the transmission voltage characteristic of the external transistor FLC cell. The result shows that continuous gray level is achieved by changing the data voltage of the designed pixel.

In the exemplary 2T1C and 3T1C embodiments of FIG. 2 and FIG. 6, the grayscale generation principle is similar. During the illumination stage, the second part of the pixel circuit functions as a voltage-controlled current source/drain. The ESH FLC pixel switches between the black and white states depending on polarity of electric field applied across the liquid crystal devices. With $V_{COM}$ set halfway between VDD and VSS, the cell will initially charge to a preset state, and switch to the other state according to the charge/discharge rate. This switching effect will occur once the potential across the FLC reaches the threshold voltage of the ESH FLC cell. The grayscale generation mechanism is based on a hybrid of "amplitude-controlled method" and "time-controlled method," with the switching operation depended on the threshold voltage of the ESH FLC. It will be appreciated that, although the disclosed exemplary embodiments utilize an exemplary $V_{COM}$ halfway between VDD and VSS, other values for $V_{COM}$ in-between VDD and VSS may be used as well.

According to the 3T1C embodiment in FIG. 10 and FIG. 11, the ramp signal is connected globally in the backplane and serves as a command signal for the illumination period, synchronizing with the color sequential backlighting unit. After all pixels are refreshed with corresponding data, the ramp signal begins ramping up, and when combined with the pixel circuit, a voltage-to-PWM converter is realized. The PWM output is coupled to the FLC electrode, hence, the grayscale is controlled by the fraction of ON-OFF period. In the 3T1C embodiments with the ramp signal, the driving scheme only has to scan the panel once, unlike the repeated scanning of bit-plane PWM techniques. In some embodiments, the speed relaxation achieved by a one-time scan makes the 3T1C suitable for thin-film transistor technology in direct-view display. The output of the pixel circuit is digitalized, therefore, the grayscale generation mechanism is a purely time-controlled basis.

Exemplary embodiments described herein use a capacitor as a storage element, and it will be appreciated that other embodiments may use other storage elements, such as inductors.

In addition, it will be appreciated that although exemplary embodiments described herein utilize a ramping voltage signal, other types of control schemes may be used to achieve similar results.

Examples of such control schemes are depicted in FIGS. 16-19. It will be appreciated that although the use of the ramping voltage signal is a compact and practical control scheme for the driving circuit, other control schemes may also be utilized to achieve similar results so long as the control schemes are able to generate a linear increase (N-type) or linear decrease (P-type) signal for voltage controlling the ON/OFF of T2.

Figure 16:
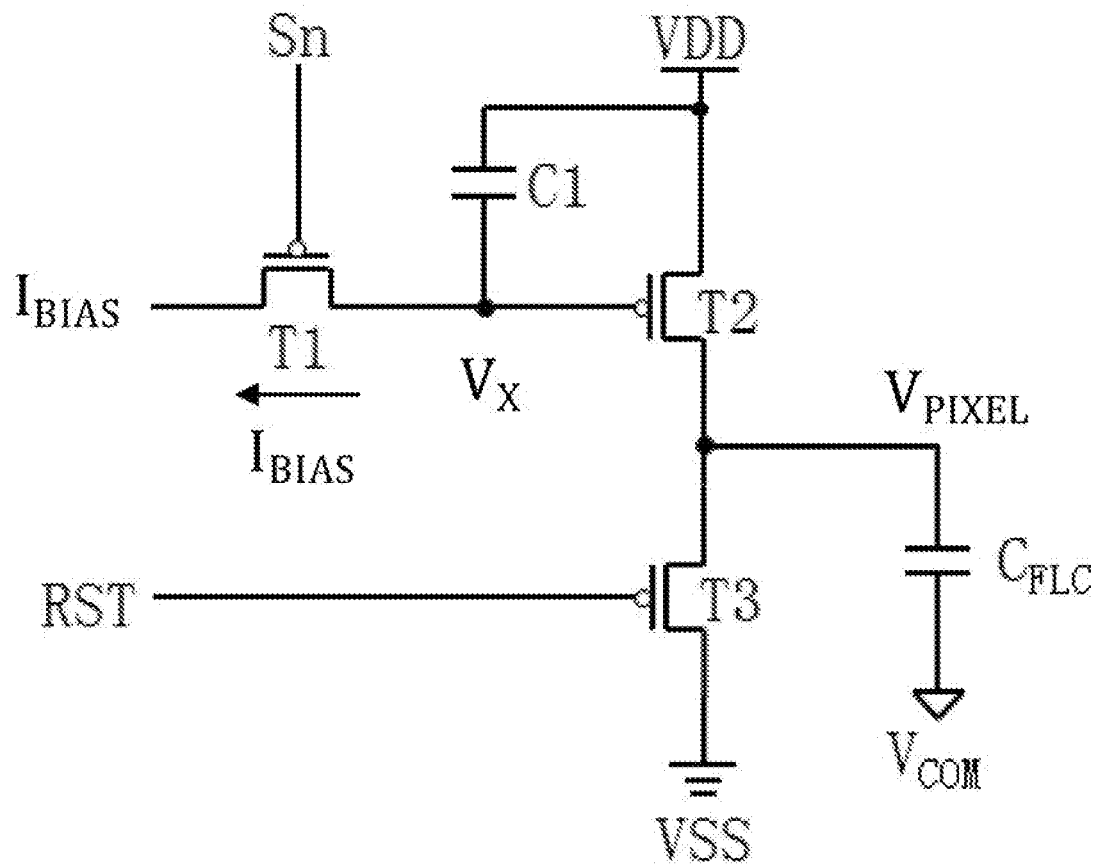
FIG. 16 provides an exemplary schematic diagram of a driving circuit according to some embodiments of the disclosure.
Figure 17:
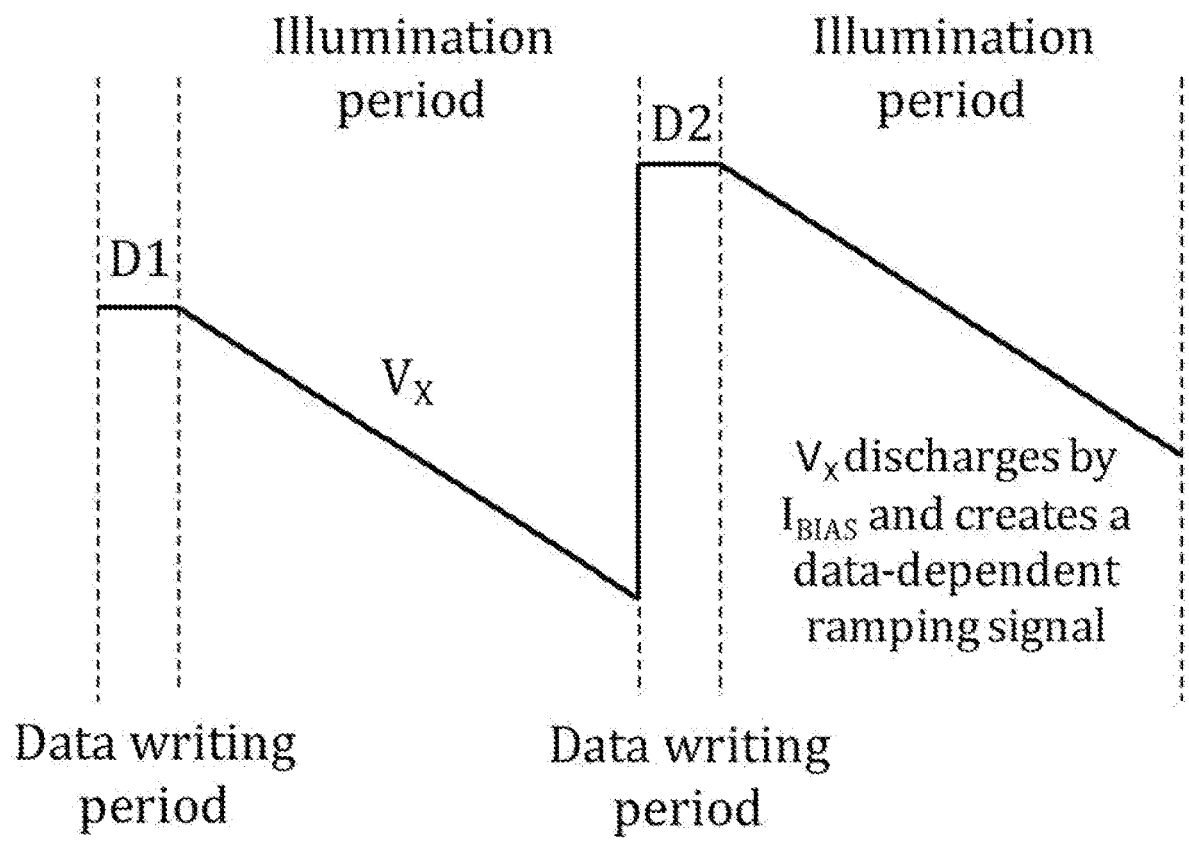
FIG. 17 is an exemplary illustration of voltage at discharge node Vx during operation of the driving circuit illustrated in FIG. 16.

FIG. 16 depicts a driving circuit similar to the driving circuit of FIG. 10B, except that the control scheme does not utilize the ramping voltage signal $V_{RAMP}$. Instead of ramping up or ramping down $V_X$ through capacitive coupling with C1, a current is used to charge up or discharge node X. An external current source is used to provide a biased current ($I_{BIAS}$) to T1 during an illumination period, and when $I_{BIAS}$ is maintained constant throughout the illumination period, a data-dependent ramping signal of $V_X$ is achieved, which controls the ON/OFF of T2 and generates a PWM output, without the ramping voltage signal $V_{RAMP}$ of FIG. 10B. The voltage at node X ($V_X$) corresponding to operation of the circuit of FIG. 16 during data writing periods (D1 and D2) and illumination periods is depicted in FIG. 17.

Figure 18:
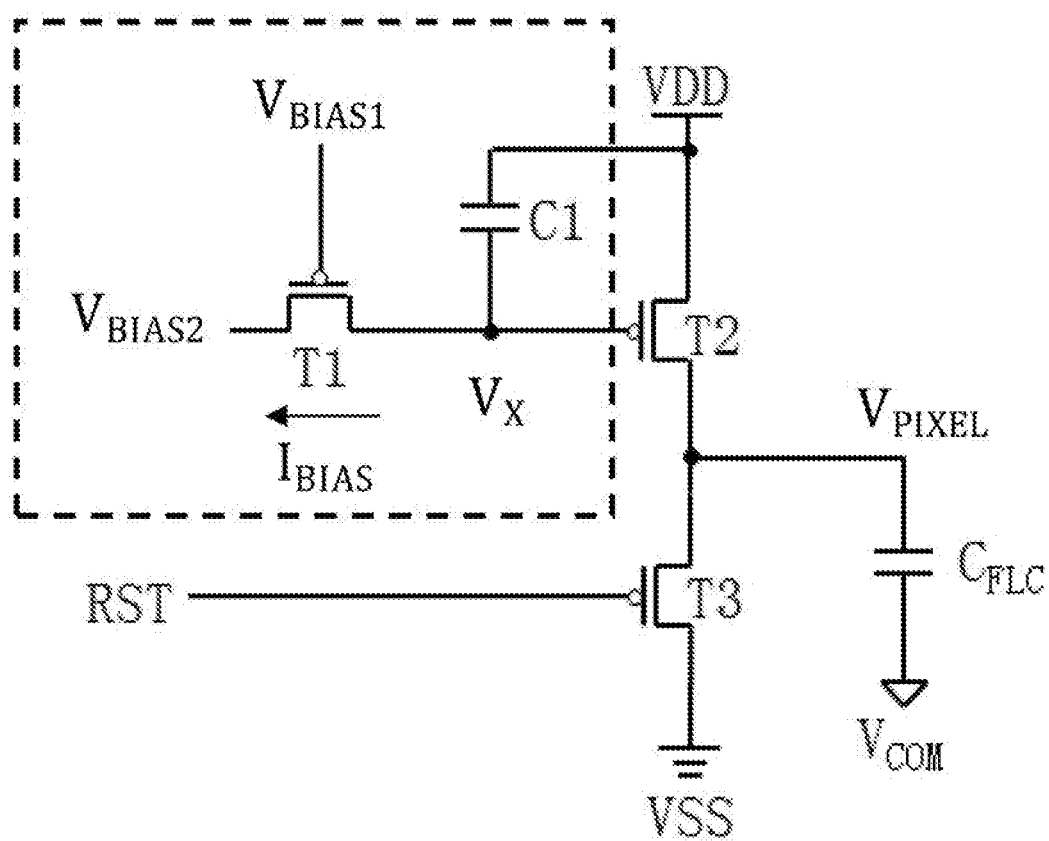
FIG. 18 provides an exemplary schematic diagram of a driving circuit according to some embodiments of the disclosure.

FIG. 18 depicts another driving circuit similar to the driving circuit of FIG. 10B that also uses a control scheme without the ramping voltage signal $V_{RAMP}$. In the approach of the FIG. 10B circuit, T1 is turned off as a switch to isolate $V_X$ during the illumination period. In the "Biased T1" approach of FIG. 18, the scan (Sn) and data (Dm) signals of the FIG. 10B circuit are modified to be two biasing signals ($V_{BIAS1}$ and $V_{BIAS2}$). These signals are applied to T1 such that T1 will be operated as a current source (N-type)/current drain (P-type) during the illumination period (or PWM period). For example, in the P-type configuration shown in FIG. 18, a drain current ($I_{BIAS}$) will be generated (for an N-type configuration, a source current would be generated). If $I_{BIAS}$ is constant, it will drop $V_X$ at a constant rate similar to the ramping design, so that a PWM output will be generated at $V_{PIXEL}$.

Figure 19:
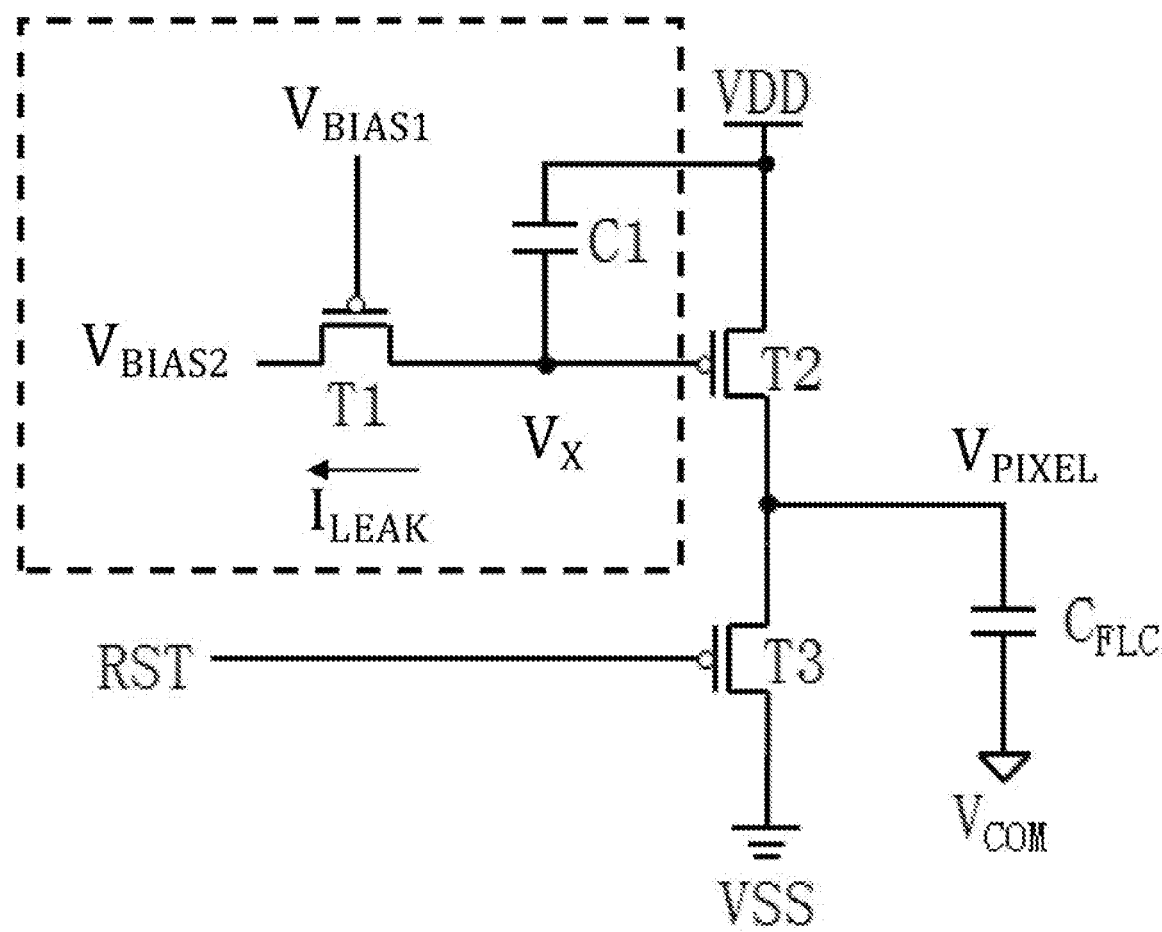
FIG. 19 provides an exemplary schematic diagram of a driving circuit according to some embodiments of the disclosure.

FIG. 19 depicts another driving circuit similar to the driving circuit of FIG. 10B that also uses a control scheme without the ramping voltage signal $V_{RAMP}$. Similar to "Biased T1" approach shown in FIG. 18, two biasing signals ($V_{BIAS1}$ and $V_{BIAS2}$) are applied to T1 during the illumination period of the "Leaky T1" approach of FIG. 19. These two signals ensure that T1 will be operating in the off state. Using a carefully designed C1, the leakage current ($I_{LEAK}$) from T1 will discharge node X to generate a ramp-like signal ($V_X$) for controlling the ON/OFF of T2. Further, in alternative embodiments, if C1 is designed to be small, the intrinsic gate capacitance ($C_{GS}$) of T2 can serve as C1, such that a separate capacitor C1 is not needed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A driving circuit for a pixel of a liquid crystal pixel array, comprising:
    a first thin film transistor;
    a second thin film transistor;
    an internal capacitor; and
    a power source;
    wherein a gate of the first thin film transistor is connected to a scan signal;
    wherein a gate of the second thin film transistor is connected to a node, wherein the node is connected to a first end of the internal capacitor and to the first thin film transistor, and wherein the second thin film transistor is configured to connect a pixel electrode of the liquid crystal pixel array to the power source;
    wherein the power source is connected to a second end of the internal capacitor;
    wherein the voltage at the node is configured to be set to a data level during a data writing period and discharged during an illumination period, wherein the voltage at the node being discharged during the illumination period is based on an external current source connected to the first thin film transistor providing a bias current $I_{BIAS}$ across the first thin film transistor;
    and
    wherein an on duration of a pixel corresponding to the pixel electrode within the illumination period is based on an on duration of the second thin film transistor within the illumination period, and wherein the on duration of the second thin film transistor within the illumination period is based on the voltage at the node.

2. The driving circuit according to claim 1, wherein the first and second thin film transistors are N-type transistors.

3. The driving circuit according to claim 1, wherein the first and second thin film transistors are P-type transistors.

4. The driving circuit according to claim 1, wherein the liquid crystal pixel array is a ferroelectric liquid crystal pixel array.

5. The driving circuit according to claim 4, wherein the ferroelectric liquid crystal pixel array is operated in an electrically suppressed helix mode.

6. The driving circuit according to claim 1, further comprising:
    a third thin film transistor; and
    another power source;
    wherein a gate of the third thin film transistor is connected to a reset signal, and wherein the third thin film transistor is configured to connect the pixel electrode of the liquid crystal pixel array to the other power source.

7. A driving circuit for a pixel of a liquid crystal pixel array, comprising:
    a first thin film transistor;
    a second thin film transistor;
    an internal capacitor; and
    a power source;
    wherein a gate of the first thin film transistor is connected to a first biasing signal, and wherein a source or a drain of the first thin film transistor is connected to a second biasing signal;
    wherein a gate of the second thin film transistor is connected to a node, wherein the node is connected to a first end of the internal capacitor and to the first thin film transistor, and wherein the second thin film transistor is configured to connect a pixel electrode of the liquid crystal pixel array to the power source;
    wherein the power source is connected to a second end of the internal capacitor;
    wherein the voltage at the node is configured to be set to a data level during a data writing period and discharged during an illumination period, wherein the voltage at the node being discharged during the illumination period is based on the first and second biasing signals generating a bias current $I_{BIAS}$ across the first thin film transistor;
    and
    wherein an on duration of a pixel corresponding to the pixel electrode within the illumination period is based on an on duration of the second thin film transistor within the illumination period, and wherein the on duration of the second thin film transistor within the illumination period is based on the voltage at the node.

8. The driving circuit according to claim 7, wherein the first and second thin film transistors are N-type transistors, and wherein the first and second biasing signals generating the bias current $I_{BIAS}$ across the first thin film transistor corresponds to the first thin film transistor being operated as a current source such that $I_{BIAS}$ is a source current.

9. The driving circuit according to claim 7, wherein the first and second thin film transistors are P-type transistors, and wherein the first and second biasing signals generating the bias current $I_{BIAS}$ across the first thin film transistor corresponds to the first thin film transistor being operated as a current drain such that $I_{BIAS}$ is a drain current.

10. The driving circuit according to claim 7, wherein the liquid crystal pixel array is a ferroelectric liquid crystal pixel array.

11. The driving circuit according to claim 10, wherein the ferroelectric liquid crystal pixel array is operated in an electrically suppressed helix mode.

12. The driving circuit according to claim 7, further comprising:
   a third thin film transistor; and
   another power source;
   wherein a gate of the third thin film transistor is connected to a reset signal, and wherein the third thin film transistor is configured to connect the pixel electrode of the liquid crystal pixel array to the other power source.

13. A driving circuit for a pixel of a liquid crystal pixel array, comprising:
   a first thin film transistor;
   a second thin film transistor;
   an internal capacitor; and
   a power source;
   wherein a gate of the first thin film transistor is connected to a first biasing signal, and wherein a source or a drain of the first thin film transistor is connected to a second biasing signal;
   wherein a gate of the second thin film transistor is connected to a node, wherein the node is connected to a first end of the internal capacitor and to the first thin film transistor, and wherein the second thin film transistor is configured to connect a pixel electrode of the liquid crystal pixel array to the power source;
   wherein the power source is connected to a second end of the internal capacitor;
   wherein the voltage at the node is configured to be set to a data level during a data writing period and discharged during an illumination period, wherein the voltage at the node being discharged during the illumination period is based on the first and second biasing signals generating a leakage current $I_{LEAK}$ across the first thin film transistor; and
   wherein an on duration of a pixel corresponding to the pixel electrode within the illumination period is based on an on duration of the second thin film transistor within the illumination period, and wherein the on duration of the second thin film transistor within the illumination period is based on the voltage at the node.

14. The driving circuit according to claim 13, wherein the first and second thin film transistors are N-type transistors.

15. The driving circuit according to claim 13, wherein the first and second thin film transistors are P-type transistors.

16. The driving circuit according to claim 13, wherein the liquid crystal pixel array is a ferroelectric liquid crystal pixel array.

17. The driving circuit according to claim 16, wherein the ferroelectric liquid crystal pixel array is operated in an electrically suppressed helix mode.

18. The driving circuit according to claim 13, further comprising:
   a third thin film transistor; and
   another power source;
   wherein a gate of the third thin film transistor is connected to a reset signal, and wherein the third thin film transistor is configured to connect the pixel electrode of the liquid crystal pixel array to the other power source.

* * * * *